US007035273B1

(12) United States Patent
Pannell et al.

(10) Patent No.: US 7,035,273 B1
(45) Date of Patent: Apr. 25, 2006

(54) QUALITY OF SERVICE QUEUEING SYSTEM FOR A NETWORK SWITCH

(75) Inventors: Donald Pannell, Cupertino, CA (US); Hugh Walsh, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 971 days.

(21) Appl. No.: 10/071,417

(22) Filed: Feb. 6, 2002

(51) Int. Cl.
*H04L 12/54* (2006.01)

(52) U.S. Cl. .................. 370/412; 370/415; 370/429
(58) Field of Classification Search ............... 370/412, 370/413, 415, 428, 429

See application file for complete search history.

(56) References Cited

U.S. PATENT DOCUMENTS

| | | | |
|---|---|---|---|
| 5,541,912 A | 7/1996 | Choudhury et al. | |
| 5,889,779 A | 3/1999 | Lincoln | |
| 5,901,147 A | 5/1999 | Joffe | |
| 5,914,934 A | 6/1999 | Rathnavelu | |
| 6,018,515 A | 1/2000 | Sorber | |
| 6,169,748 B1 | 1/2001 | Barbas et al. | |
| 6,205,118 B1 | 3/2001 | Rathnavelu | |
| 6,246,682 B1 | 6/2001 | Roy et al. | |
| 6,256,315 B1 | 7/2001 | Barbas et al. | |
| 6,262,986 B1 | 7/2001 | Oba et al. | |
| 6,262,989 B1 | 7/2001 | Gemar et al. | |
| 6,539,024 B1 * | 3/2003 | Janoska et al. | 370/412 |
| 6,625,159 B1 * | 9/2003 | Singh et al. | 370/413 |
| 6,704,316 B1 * | 3/2004 | He | 370/397 |

OTHER PUBLICATIONS

Nong, Ge and Hamdi, Mounir, "On the Provision of Quality-of-Service Guarantees for Input Queued Switches," IEEE Communications Magazine, Dec. 2000, pp. 62-77.
Seifert, Rich, "The Switch Book: The Complete Guide to LAN Switching Technology," Wiley Computer Publishing: New York, New York, 2000, Chapter 13, pp. 515-544.
Cyriel Minkenberg and Ton Engbersen, "A Combined Input and Output Queued Packet-Switched System Based on PRIZMA Switch-on-a-Chip Technology," IEEE Communications Magazine, Dec. 2000, pp. 70-77.

(Continued)

*Primary Examiner*—Melvin Marcelo

(57) ABSTRACT

In general, in one aspect, the invention features a method, apparatus, and computer-readable media for sending a frame of data from a first channel to a second channel using at least one of m memory buffers for storing a frame, m being at least 2, in which n of the m buffers have an available status and p of the m buffers have an unavailable status, wherein m=n+p. It comprises reserving q of the n buffers having the available status to the first channel; reserving r of the n buffers having the available status to the second channel, wherein q+r≦n; when a frame is received from the first channel, storing the frame in i of the q buffers, wherein 1≦i≦q, and changing status of the i buffers to unavailable; selectively assigning the frame to the second channel based on a number s of the q buffers, wherein s≦q; and wherein if the frame is assigned to the second channel, the frame is sent to the second channel from the i buffers and the status of the i buffers is changed to available; and if the frame is not assigned to the second channel, the frame is discarded and the status of the i buffers is changed to available.

160 Claims, 11 Drawing Sheets

OTHER PUBLICATIONS

H. Jonathan Chao, Cheuk H. Lam, Eiji Oki, "Broadband Packet Switching Technologies: A Practical Guide to ATM Switches and IP Routers," New York, New York, 2001, pp. 321-324.

Abhijit K. Choudhury and Ellen L. Hahne, "Dynamic Queue Length Thresholds for Shared-Memory Packet Switches," Bell Laboratories, Holmdel, NJ, IEEE/ACM Transactions on Networking, vol. 6, No. 2, Apr. 1998, pp. 130-140.

* cited by examiner

QUALITY OF SERVICE QUEUEING SYSTEM FOR A NETWORK SWITCH

BACKGROUND

The present invention relates generally to data communications, and particularly to a queuing system implementing multiple classes of service within a network switch.

The rapidly increasing popularity of networks such as the Internet has spurred the development of network services such as streaming audio and streaming video. These new services have different latency requirements than conventional network services such as electronic mail and file transfer. New quality of service (QoS) standards require that network devices, such as network switches, address these latency requirements. For example, the IEEE 802.1 standard divides network traffic into several classes of service based on sensitivity to transfer latency, and prioritizes these classes of service. The highest class of service is recommended for network control traffic, such as switch-to-switch configuration messages. The remaining classes are recommended for user traffic. The two highest user traffic classes of service are generally reserved for streaming audio and streaming video. Because the ear is more sensitive to missing data than the eye, the highest of the user traffic classes of service is used for streaming audio. The remaining lower classes of service are used for traffic that is less sensitive to transfer latency, such as electronic mail and file transfers.

FIG. 1 shows a simple network 100 in which a network switch 102 connects two devices 104A and 104B. Each of devices 104 can be any network device, such as a computer, a printer, another network switch, or the like. Switch 102 transfers data between devices 104 over channels 106A and 106B, and can also handle an arbitrary number of devices in addition to devices 104. Channels 106 can include fiber optic links, wireline links, wireless links, and the like.

FIG. 2 is a block diagram of a conventional shared-memory output-queue store-and-forward network switch 200 that can act as switch 102 in network 100 of FIG. 1. Switch 200 has a plurality of ports including ports 202A and 202N. Each port 202 is connected to a channel 204, a queue controller 206 and a memory 208. Each port 202 includes an ingress module 214 that is connected to a channel 204 by a physical layer (PHY) 210 and a media access controller (MAC) 212. Referring to FIG. 2, port 202A includes an ingress module 214A that is connected to channel 204A by a MAC 212A and a PHY 210A, while port 202N includes an ingress module 214N that is connected to channel 204N by a MAC 212N and a PHY 210N. Each port 202 also includes an egress module 216 that is connected to a channel 204 by a MAC 218 and a PHY 220. Referring to FIG. 2, port 202A includes an egress module 216A that is connected to channel 204A by a MAC 218A and a PHY 220A, while port 202N includes an egress module 216N that is connected to channel 204N by a MAC 218N and a PHY 220N.

FIG. 3 is a flowchart of a conventional process 300 performed by network switch 200. At power-on, queue controller 206 initializes a list of pointers to unused buffers in memory 208 (step 302). A port 202 of switch 200 receives a frame from a channel 204 (step 304). The frame enters the port 202 connected to the channel 204 and traverses the PHY 210 and MAC 212 of the port 202 to reach the ingress module 214 of the port 202. Ingress module 214 requests and receives one or more pointers from queue controller 206 (step 306). Ingress module 214 stores the frame at the buffers in memory 208 that are indicated by the received pointers (step 308).

Ingress module 214 then determines to which channel (or channels in the case of a multicast operation) the frame should be sent, according to methods well-known in the relevant arts (step 310). Queue controller 206 sends the selected pointers to the egress modules 216 of the ports connected to the selected channels (step 312). These egress modules 216 then retrieve the frame from the buffers indicated by the pointers (step 314) and send the frame to their respective channels 204 (step 316). These egress modules 216 then release the pointers for use by another incoming frame (step 318). The operation of switch 200 is termed "store-and-forward" because the frame is stored completely in the memory 208 before leaving the switch 200. The store-and-forward operation creates some latency. Because all of the switch ports 202 use the same memory 208, the architecture of switch 202 is termed "shared memory."

The queue controller 206 performs the switching operation by operating only on the pointers to memory 208. The queue controller 206 does not operate on the frames. If pointers to frames are sent to an egress module 216 faster than that egress module 216 can transmit the frames over its channel 204, the pointers are queued within that port's output queue 216. Because pointers accumulate only at the output side of switch 200, the architecture of switch 200 is also termed "output-queued." Thus switch 200 has a store-and-forward, shared-memory, output-queued architecture.

In an output-queued switch, the queue controller must enqueue a frame received on a port to all of the output queues selected for that frame before the next frame is completely received on that port. Thus at any time only one complete frame can be present at each input port, while the output queues can be arbitrarily large. Thus the latency of an output-queued switch has two components: ingress latency and egress latency. Ingress latency is the period between the reception of a complete frame at an ingress module and the enqueuing of the pointers to that frame at all of the output queues to which the frame is destined. Egress latency is the period between enqueuing of the pointers to a frame in an output queue of a port and the completion of the transmission of that frame from that port.

Of course, QoS is relevant only when the switch is congested. When the amount of data entering the switch exceeds the amount of data exiting the switch, the output queues fill with pointers to frames waiting to be transmitted. If congestion persists, the memory will eventually fill with frames that have not left the switch. When the memory is full, incoming frames are dropped. When memory is nearly full and free memory buffers are rare, QoS dictates the free buffers be allocated to frames having high classes of service. But when the switch is uncongested, free memory buffers are plentiful, and no preferential treatment of frames is necessary to achieve QoS.

QoS is implemented in an output-queued store-and-forward switch by controlling the overall latency for each frame such that frames having a high class of service experience less latency than frames having lower classes of service. Many conventional solutions exist to reduce egress latency. However, solutions for reducing ingress latency in an output-queued store-and-forward switch either do not exist, or have proven unsatisfactory.

SUMMARY

In general, in one aspect, the invention features a method, apparatus, and computer-readable media for sending a frame of data from a first channel to a second channel using at least one of m memory buffers for storing a frame, m being at least 2, in which n of the m buffers have an available status and p of the m buffers have an unavailable status, wherein m=n+p. It comprises reserving q of the n buffers having the available status to the first channel; reserving r of the n buffers having the available status to the second channel, wherein q+r≦n; when a frame is received from the first channel, storing the frame in i of the q buffers, wherein 1≦i≦q, and changing status of the i buffers to unavailable; selectively assigning the frame to the second channel based on a number s of the q buffers, wherein s≦q; and wherein if the frame is assigned to the second channel, the frame is sent to the second channel from the i buffers and the status of the i buffers is changed to available; and if the frame is not assigned to the second channel, the frame is discarded and the status of the i buffers is changed to available.

Particular implementations can include one or more of the following features. The number of buffers s=q. The number of buffers s=q−i. The selectively assigning step comprises selectively assigning the frame to the second channel based on a level of congestion on the second channel. The selectively assigning step further comprises discarding the frame when the second channel is congested and the number of the s buffers is below a first threshold; discarding the frame when the second channel is not congested and the number of the s buffers is below a second threshold, wherein the first threshold is greater than the second threshold; and assigning the frame to the second channel when the number of the s buffers is equal to or greater than the first threshold. Each frame has one of a plurality of classes of service, wherein each class of service has associated therewith first and second predetermined thresholds, and wherein the selectively assigning step further comprises discarding the frame when the second channel is congested and the number of the q s buffers is below the first predetermined threshold of the associated class of service of the frame; discarding the frame when the second channel is not congested and the number of the s buffers is below the second predetermined threshold of the associated class of service of the frame, wherein the first predetermined threshold of the associated class of service of the frame is greater than the second predetermined threshold of the associated class of service of the frame; and assigning the frame to the second channel when the number of the q s buffers is equal to or greater than the first predetermined threshold of the associated class of service of the frame. Each frame has one of a plurality of classes of service associated therewith, and wherein the step of reserving q of the n buffers comprises reserving the q available buffers for the first channel based on one of the classes of service associated with a frame received from the first channel. The q available buffers are reserved for the first channel based on the one class of service of a last frame received from the first channel. A first port is associated with the first channel and a second port is associated with the second channel, and wherein the assigning step comprises sending, to the second port, the identity of the i buffers storing the frame. A first port is associated with the first channel and a second port is associated with the second channel, and implementations can comprise receiving, at the first port, a frame from the first channel; storing the frame in i of the q buffers; changing the status of the i buffers to unavailable; sending, to the second port, the identity of the i buffers storing the frame; retrieving, at the second port, the frame using the identity of the i buffers storing the frame; sending the frame to the second channel; and changing the status of the i buffers to available.

In general, in one aspect, the invention features a method, apparatus, and computer-readable media for sending a frame of data from a first device to a second device through a network switch having m memory buffers for storing a frame, m being at least 2, in which n of the m buffers have an available status and p of the m buffers have an unavailable status, wherein m=n+p, wherein the first device is connected to the network switch by a first channel and the second device is connected to the network switch by a second channel. It includes selecting, by the first device, the second device as a destination for the frame; sending, by the first device, the frame to the first channel; reserving q of the n buffers having the available status to the first channel; reserving r of the n buffers having the available status to the second channel, wherein q+r≦n; when the frame is received from the first channel, storing the frame in i of the q buffers, wherein 1≦i≦q, and changing status of the i buffers to unavailable; selectively assigning the frame to the second channel based on a number s of the q buffers, wherein s≦q; wherein if the frame is assigned to the second channel, the frame is sent to the second channel from the i buffers and the status of the i buffers is changed to available; and wherein if the frame is not assigned to the second channel, the frame is discarded and the status of the i buffers is changed to available; and receiving, by the second device, the frame from the second channel if the frame is assigned to the second channel.

In general, in one aspect, the invention features a network. It comprises a network switch having m memory buffers for storing a frame of data, m being at least 2, in which n of the m buffers have an available status and p of the m buffers have an unavailable status, wherein m=n+p; a first device connected to the network switch by a first channel; a second device connected to the network switch by a second channel; wherein the first device selects the second device as a destination for the frame and sends the frame to the first channel; wherein the network switch reserves q of the n buffers having the available status to the first channel, and reserves r of the n buffers having the available status to the second channel, wherein q+r≦n; wherein when the frame is received from the first channel, the network switch stores the frame in i of the q buffers, wherein 1≦i≦q, and changes status of the i buffers to unavailable; and wherein the network switch selectively assigns the frame to the second channel based on a number s of the q buffers, wherein s≦q; wherein if the frame is assigned to the second channel, the frame is sent to the second channel from the i buffers and the status of the i buffers is changed to available; and wherein if the frame is not assigned to the second channel, the frame is discarded and the status of the i buffers is changed to available; and wherein the second device receives the frame from the second channel if the frame is assigned to the second channel.

In general, in one aspect, the invention features a method, apparatus, and computer-readable media for sending a frame of data from a first channel to a second channel using at least one of m memory buffers for storing a frame, m being at least 2, in which n of the m buffers have an available status and p of the m buffers have an unavailable status, wherein m=n+p. It comprises reserving q of the n buffers having the available status to the first channel; reserving r of the n buffers having the available status to the second channel, wherein q+r≦n; when a frame is received from the first channel, storing the frame in i of the q buffers, wherein 1≦i≦q, and changing status of the i buffers to unavailable; sending the frame to the second channel and changing the status of the i buffers to available; and exercising flow control on the first channel when a number s of the q buffers is below a predetermined threshold, wherein s≦q.

Particular implementations can include one or more of the following features. The number of buffers s=q. The number of buffers s=q−i. Implementations can comprise terminating flow control on the first channel when the number of q s buffers is above a second predetermined threshold. Each frame has one of a plurality of classes of service associated therewith, and the step of reserving q of the n buffers comprises reserving the q available buffers for the first channel based on one of the classes of service associated with a frame received from the first channel. The q available buffers are reserved for the first channel based on the one class of service of a last frame received from the first channel. A first port is associated with the first channel and a second port is associated with the second channel, and the assigning step comprises sending, to the second port, the identity of the i buffers storing the frame. A first port is associated with the first channel and a second port is associated with the second channel, and implementations comprise receiving, at the first port, a frame from the first channel; storing the frame in i of the q buffers; changing the status of the i buffers to unavailable; sending, to the second port, the identity of the i buffers storing the frame; retrieving, at the second port, the frame using the identity of the i buffers storing the frame; sending the frame to the second channel; and changing the status of the i buffers to available. The exercising step comprises sending a pause frame to the first channel. The terminating step comprises sending a pause release frame to the first channel.

In general, in one aspect, the invention features a method, apparatus, and computer-readable media for sending a frame of data from a first device to a second device through a network switch having m memory buffers for storing a frame, m being at least 2, in which n of the m buffers have an available status and p of the m buffers have an unavailable status, wherein m=n+p, wherein the first device is connected to the network switch by a first channel and the second device is connected to the network switch by a second channel. It comprises selecting, by the first device, the second device as a destination for the frame; sending, by the first device, the frame to the first channel; reserving q of the n buffers having the available status to the first channel; reserving r of the n buffers having the available status to the second channel, wherein q+r≦n; wherein when the frame is received from the first channel, the network switch stores the frame in i of the q buffers, wherein 1≦i≦q, and changes status of the i buffers to unavailable; wherein the network switch sends the frame to the second channel and changes the status of the i buffers to available; wherein the network switch exercises flow control on the first channel when a number s of the q buffers is below a predetermined threshold, wherein s≦q; and receiving, by the second device, the frame from the second channel.

In general, in one aspect, the invention features a network. It comprises a network switch having m memory buffers for storing a frame of data, m being at least 2, in which n of the m buffers have an available status and p of the m buffers have an unavailable status, wherein m=n+p; a first device connected to the network switch by a first channel; and a second device connected to the network switch by a second channel; wherein the network switch reserves q of the n buffers having the available status to the first channel, and reserves r of the n buffers having the available status to the second channel, wherein q+r≦n; wherein when a frame is received from the first channel, the network switch stores the frame in i of the q buffers, wherein 1≦i≦q, and changes status of the i buffers to unavailable; wherein the network switch sends the frame to the second channel and changes the status of the i buffers to available; wherein the network switch exercises flow control on the first channel when a number s of the q buffers is below a predetermined threshold, wherein s≦q; and wherein the second device receives the frame from the second channel.

The details of one or more implementations are set forth in the accompanying drawings and the description below. Other features will be apparent from the description and drawings, and from the claims.

Figure 1:
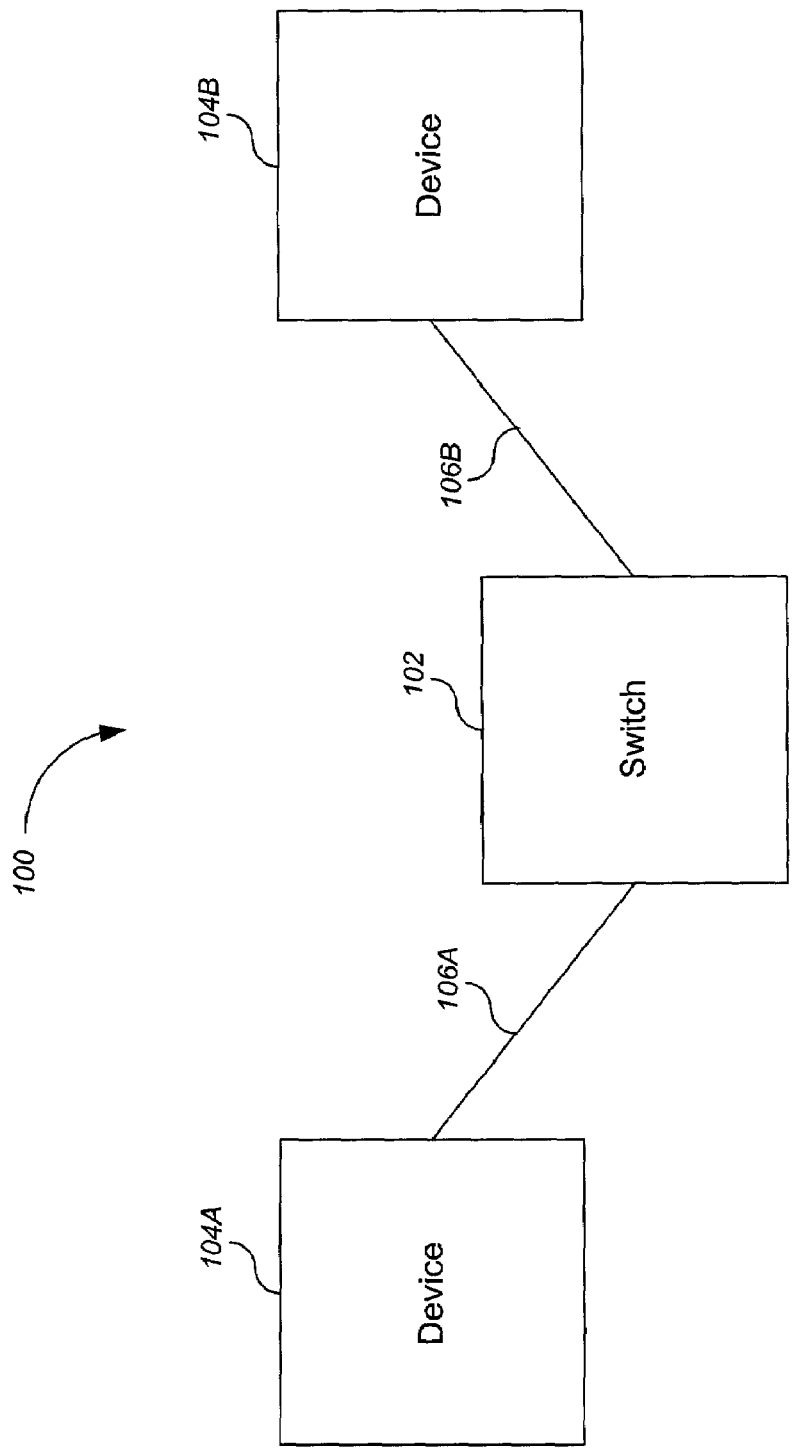
FIG. 1 shows a simple network in which a network switch connects two devices.

The leading digit(s) of each reference numeral used in this specification indicates the number of the drawing in which the reference numeral first appears.

DETAILED DESCRIPTION

Figure 2:
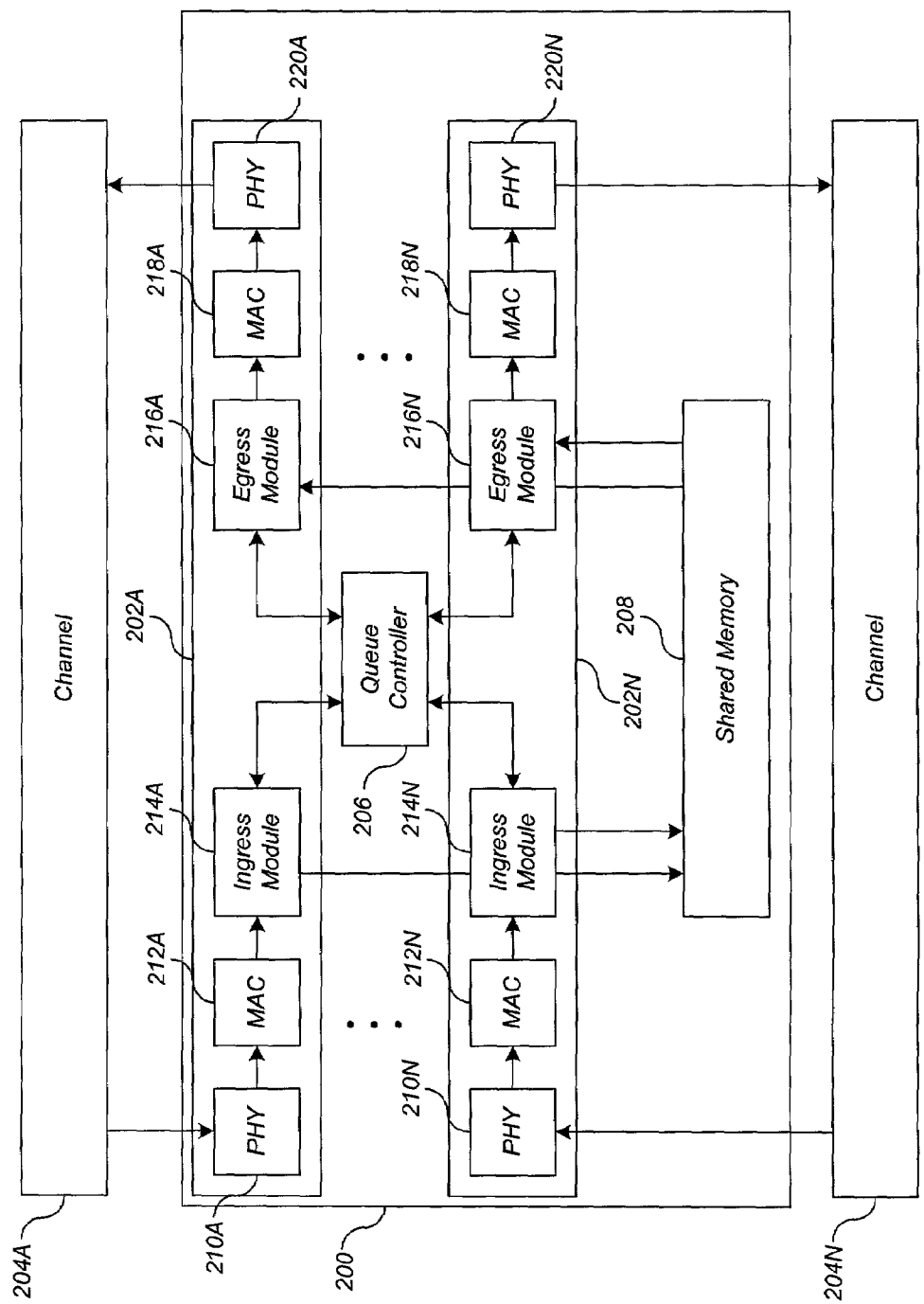
FIG. 2 is a block diagram of a conventional shared-memory output-queue store-and-forward network switch that can act as the switch in the network of FIG. 1.
Figure 3:
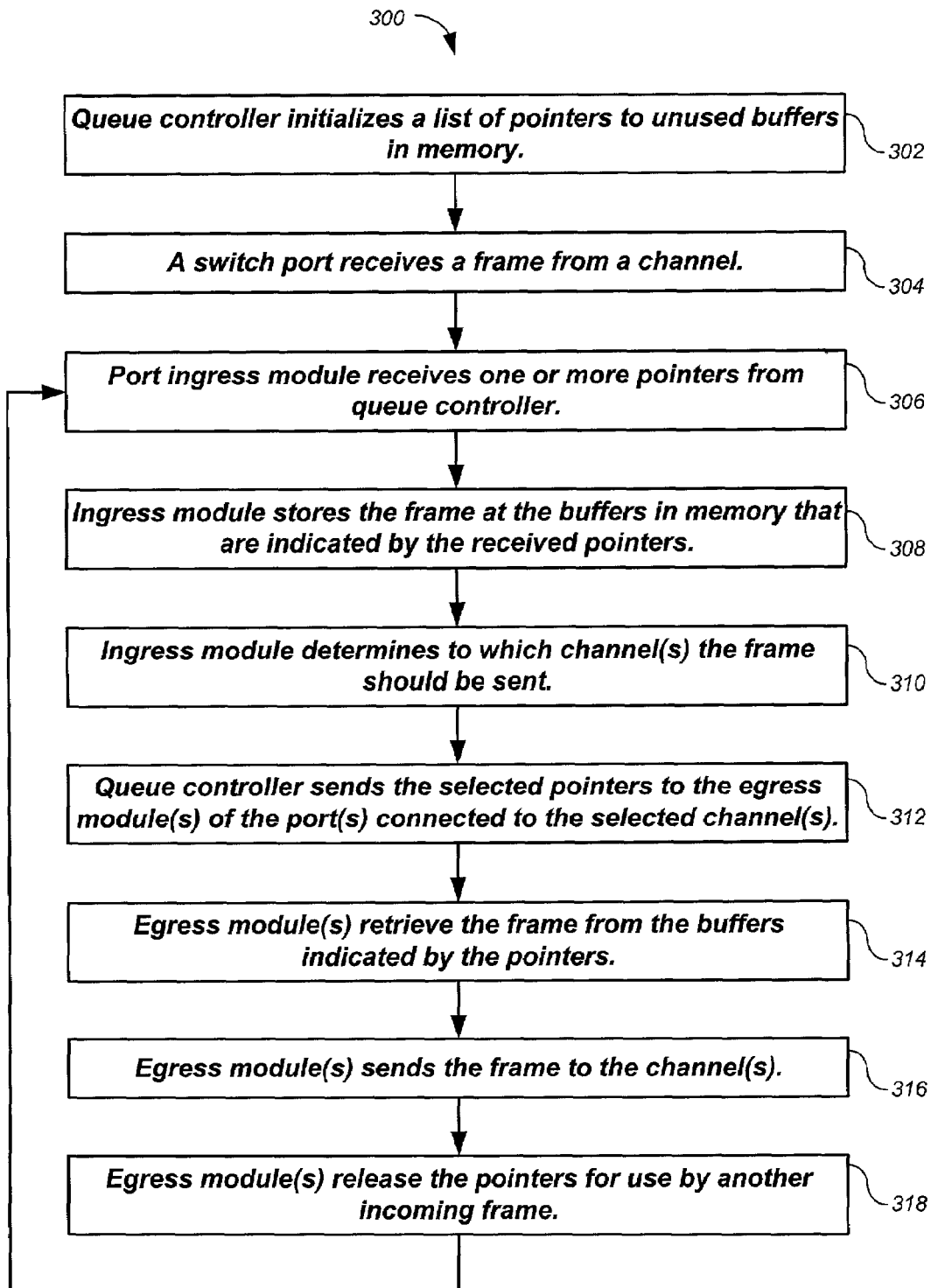
FIG. 3 is a flowchart of a conventional process performed by network switch.
Figure 4:
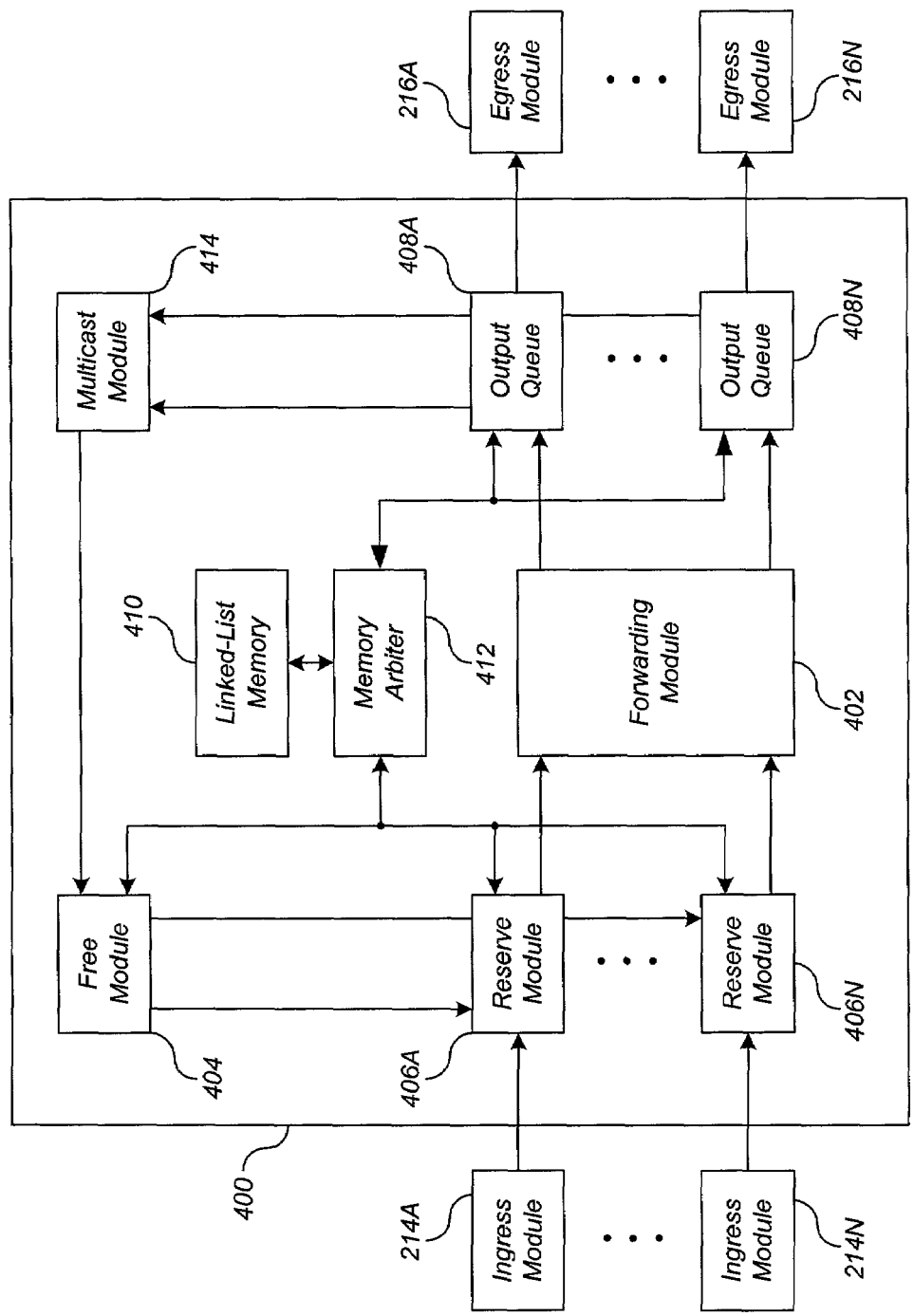
FIG. 4 is a block diagram of a queue controller suitable for use as the queue controller in the network switch of FIG. 2.

FIG. 4 is a block diagram of a queue controller 400 suitable for use as queue controller 206 in network switch 200 of FIG. 2. Queue controller 400 can be implemented using hardware, software, or any combination thereof. Queue controller 400 includes a forwarding module 402, a free module 404, a plurality of reserve modules 406A through 406N, and a plurality of output queues 408A through 408N. Each reserve module 406 is connected to one of ingress modules 214. Each output queue 408 is connected to one of egress modules 216.

Free module 404 and reserve modules 406 are each contain one linked list of pointers to buffers in shared memory 208. Each output queue 408 contains a priority queue for each class of service implemented by switch 400. Each priority queue contains one linked list of pointers to buffers in shared memory 208. In one implementation, switch 400 implements four classes of service labeled class 0 through class 3, with class 3 having the highest priority. In this implementation, each output queue 408 contains four priority queues. Other implementations can implement fewer or greater classes of service, as will be apparent to one skilled in the relevant art after reading this description.

All of the linked lists for free module 404, reserve modules 406, and output queues 408 are stored in a linked-list memory 410. A memory arbiter 412 arbitrates among competing requests to read and write linked-list memory 410. Each of free module 404, reserve modules 406, and output queues 408 maintains an object that describes its linked list. Each of these objects maintains the size of the list and pointers to the head and tail of the list. Each of free module 404, reserve modules 406, and output queues 408 traverses its linked list by reading and writing the "next" links into and out of linked list memory 410.

Figure 5:
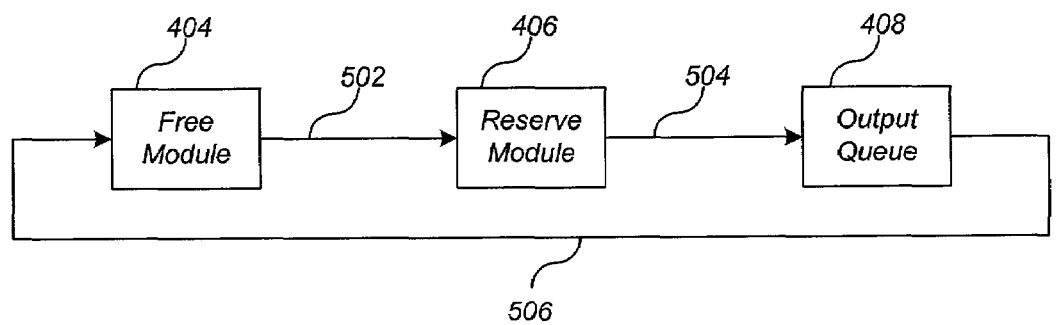
FIG. 5 depicts the manner in which pointers to buffers circulate within queue controller.

Free module 404 contains pointers to buffers in memory 208 that are available to store newly-received frames (that is, the buffers have an available status). Each reserve module 406 contains a list of pointers to available buffers that are reserved for the port housing that reserve module. FIG. 5 depicts the manner in which these pointers circulate within queue controller 400. Queue controller 400 allocates pointers from free module 404 to reserve modules 406 according to the methods described below (flow 502). Buffers associated with pointers in a free module 404 have an available status until a frame is stored in the buffers. Storing a frame in one or more buffers changes the status of those buffers to unavailable. To forward a frame to an output port, the frame is stored in a buffer in memory 208, and the pointers to that buffer are transferred to the output queue 408 for that output port (flow 504). When a frame is sent from an output port to a channel 106, the pointers for that frame are returned to free module 404, thereby changing the status of the pointers to available (flow 506).

Multicast module 414 handles multicast operations. In linked-list memory 410, pointers associated with the start of a frame also have a vector including a bit for each destined output port for the frame. When an output port finishes transmitting a frame, the output queue passes the frame's pointers to multicast module 414, which clears the bit in the destination vector associated with that output port. When all of the bits in the destination vector have been cleared, the frame's pointers are returned to free module 404.

Figure 6A:
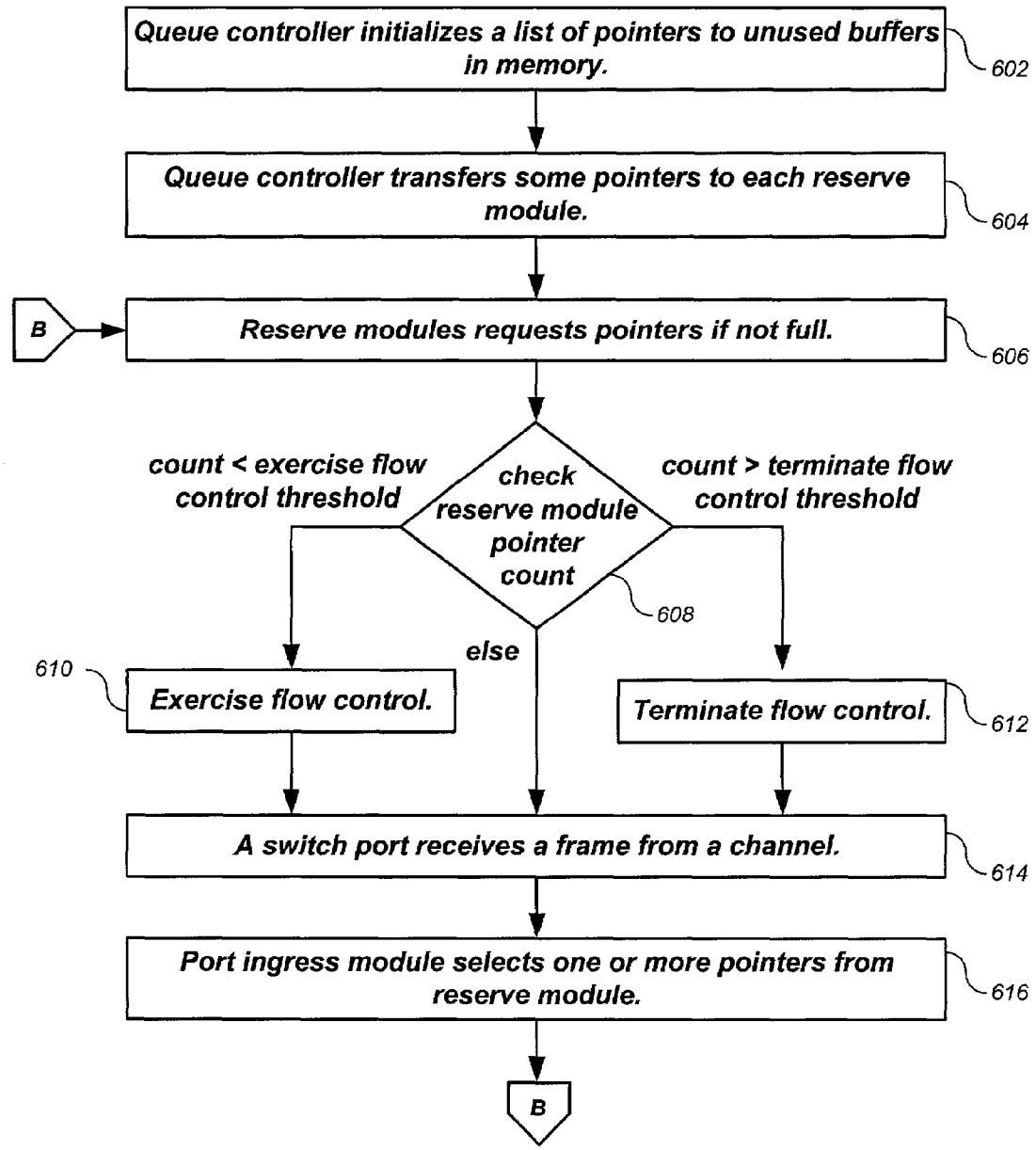
FIGS. 6A and 6B show a flowchart of a process of a network switch such as the network switch of FIG. 2 under the control of the queue controller of FIG. 2 according to an implementation having flow control enabled.
Figure 6B:
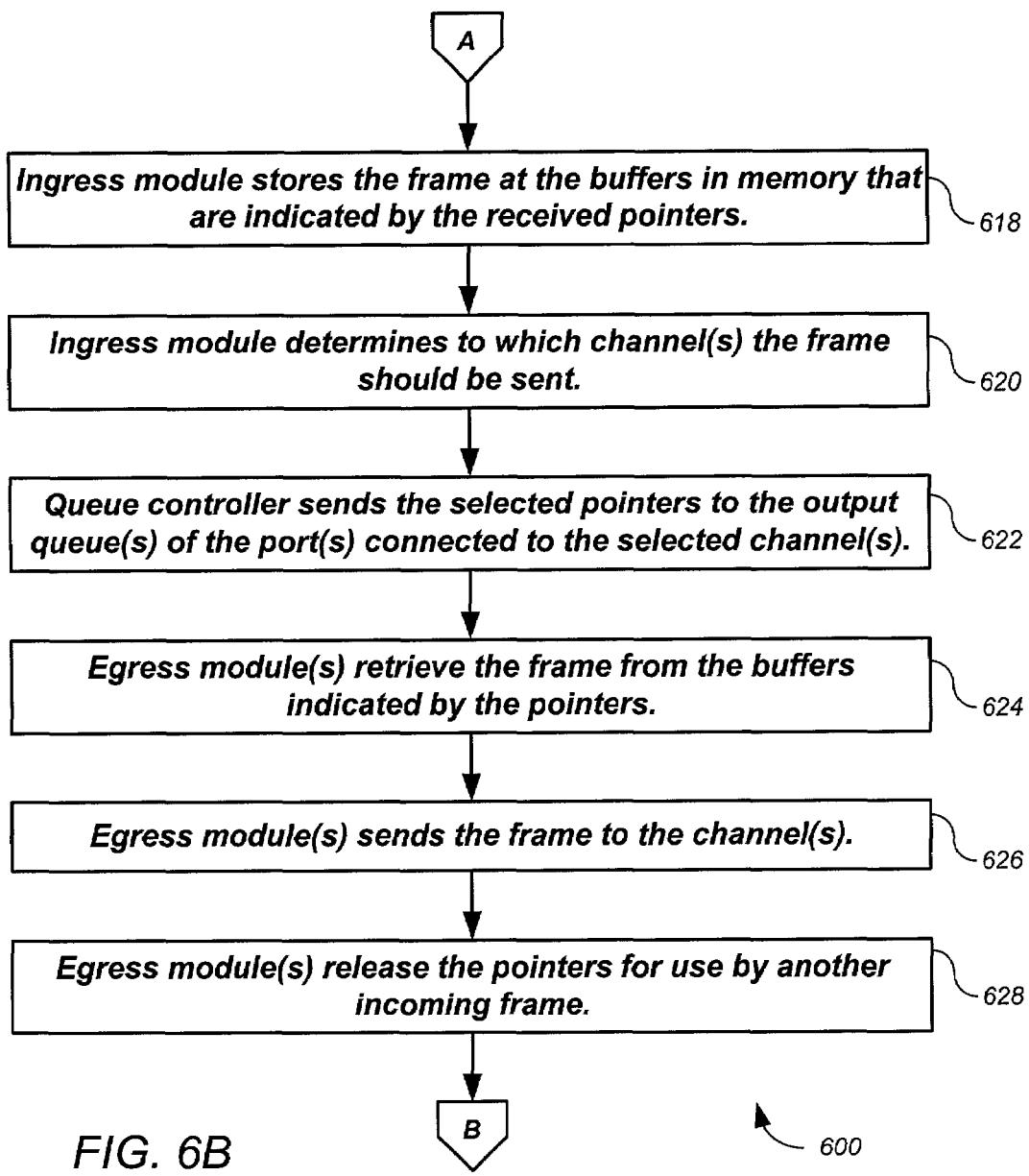

FIGS. 6A and 6B show a flowchart of a process 600 of a network switch such as switch 200 under the control of queue controller 400 according to an implementation having flow control enabled. When flow control is enabled, switch 200 must store and forward all of the frames it receives; it cannot discard any frames. At power-on of switch 200, queue controller 400 initializes free module 404 to contain a number of pointers to unused buffers in memory 208 (step 602). Each port waits until the link goes up for its channel, and its port state is enabled, before requesting pointers from free module 404. Queue controller 400 transfers some of these pointers to each reserve module (step 604). For example, queue controller 400 transfers a number of these pointers to a reserve module 314. When a port's link goes down, or its port state is disabled, the port's reserve module returns all of its pointers to free module 404, thereby maximizing buffer availability for the other ports. The port then idles until its link is up and its port state is enabled.

Each reserve module 406 includes a counter to count the number of pointers in the reserve module. When the number of pointers is below the capacity of the reserve module 406, the reserve module continually requests pointers from free module 404 (step 606). Each port 202 exercises flow control on its link based on the count of pointers in its reserve module 406. When the count of pointers in the reserve module 406 of a port 202 falls below an exercise flow control threshold (step 608), the port exercises flow control on its channel 204 (step 610). This reduces or eliminates traffic from the other devices on the channel 204 bound for switch 200, which eases congestion within the switch, thereby increasing the number of pointers in free module 404, and consequently increasing the number of pointers in reserve modules 406. When the count of pointers in the reserve module 406 of a port 202 rises above a terminate flow control threshold (step 608), the port terminates flow control on its channel 204 (step 612). This allows the level of traffic from other devices on the channel 204 bound for switch 200 to increase.

In an implementation where a port 202 is connected to a full-duplex channel, the port 204 exercises flow control on the channel by sending a "pause" frame to the channel, and releases flow control by sending a "pause release" frame to the channel, in accordance with the IEEE 802.3 standard. In an implementation where a port 202 is connected to a half-duplex channel, the port 204 exercises and terminates flow control on the channel by other well-known methods such as forced collisions or earlier carrier sense assertion.

In one implementation, the capacity of each reserve module 406 is 32 pointers, the count runs from 0 to 31, the exercise flow control threshold is 6, and the terminate flow control threshold is 24.

A port 202 of switch 200 receives a frame from a channel 204 (step 614). The frame enters the port 202 connected to the channel 204 and traverses the PHY 210 and MAC 212 of the port 202 to reach the ingress module 214 of the port 202. Ingress module 214 selects one or more pointers from the reserve module 406 for the port 202 (step 616). Ingress module 214 stores the frame in memory 208 at the buffers that are indicated by the received pointers (step 618).

Ingress module 214 then determines to which channel (or channels in the case of a multicast operation) the frame should be sent, according to methods well-known in the relevant arts (step 620). Queue controller 206 sends the selected pointers to the output queues 408 of the ports connected to the selected channels (step 622). In one implementation, forwarding module 402 does this by linking the pointers to the output queues 408 of the ports 202 connected to the selected channel. When the pointers for a frame reach the head of an output queue 408 of a port 202, the egress module 216 of that port then retrieves the frame from the buffers indicated by the pointers (step 624) and sends the frame to its channel 204 (step 626). The output queue 408 then releases the pointers by returning them to free module 404 (step 628). Process 600 then resumes at step 606.

An example of process 600 is now discussed with reference to FIG. 1. Device 104A has data to transmit to device 104B. Device 104 generates a frame of the data, and selects device 104B as the destination for the frame. Device 104A then sends the frame to channel 106A. The frame subsequently arrives at switch 102.

Switch 102 has a memory including a plurality of memory buffers m for storing a frame. The buffers include n available buffers and p unavailable buffers such that m=n+p. Switch 102 reserves q of the n buffers for channel 106A by sending q pointers to the reserve module for channel 106A. Switch 102 also reserves some of the remaining available buffers to other channels. For example, switch 102 reserves r of the n buffers for channel 106B by sending r pointers to the reserve module for channel 106B, where q+r≦n. When switch 102 receives the frame from channel 106A, it stores the frame in i of the q buffers, wherein $1 \leq i \leq q$, thereby changing the status of the i buffers to unavailable. In one implementation, $1 \leq i \leq 3$. Switch 102 then determines that the frame should be sent to channel 106B, and so sends the frame to channel 106B. Device 104B receives the frame.

Switch 102 exercises flow control over channel 106A based on a number s of the q buffers reserved to the first channel. In one implementation, the number s includes the number of buffers i used to store the frame, so s=q. In another implementation, the number s does not include the number of buffers i used to store the frame, so s=q−i.

Process 600 implements flow control efficiently in an output-queued switch, and complies with the IEEE 802.3 standard for flow control. The IEEE 802.3 flow control standard was devised for input-queued switches, because in input-queued switches, it is clear that the channel causing congestion in an input queue is the channel connected to that input queue. Output-queued switches are preferred to input-queued switches because they require less power and chip area. But in conventional output-queued switches, it is difficult to determine which channels are causing congestion in an output queue because it is difficult or impossible to determine the channel from which the frames in an output queue were received. One conventional solution is to simply exercise flow control over all of the channels connected to a switch whenever any output queue becomes congested. The reserve module mechanism described above solves this problem. When the number of buffers in a reserve module falls below the exercise flow control threshold, it is clear that the channel connected to that reserve module is causing congestion, and flow control is exercised only on that channel. Thus process 600 provides efficient flow control in an output-queued switch.

Figure 7:
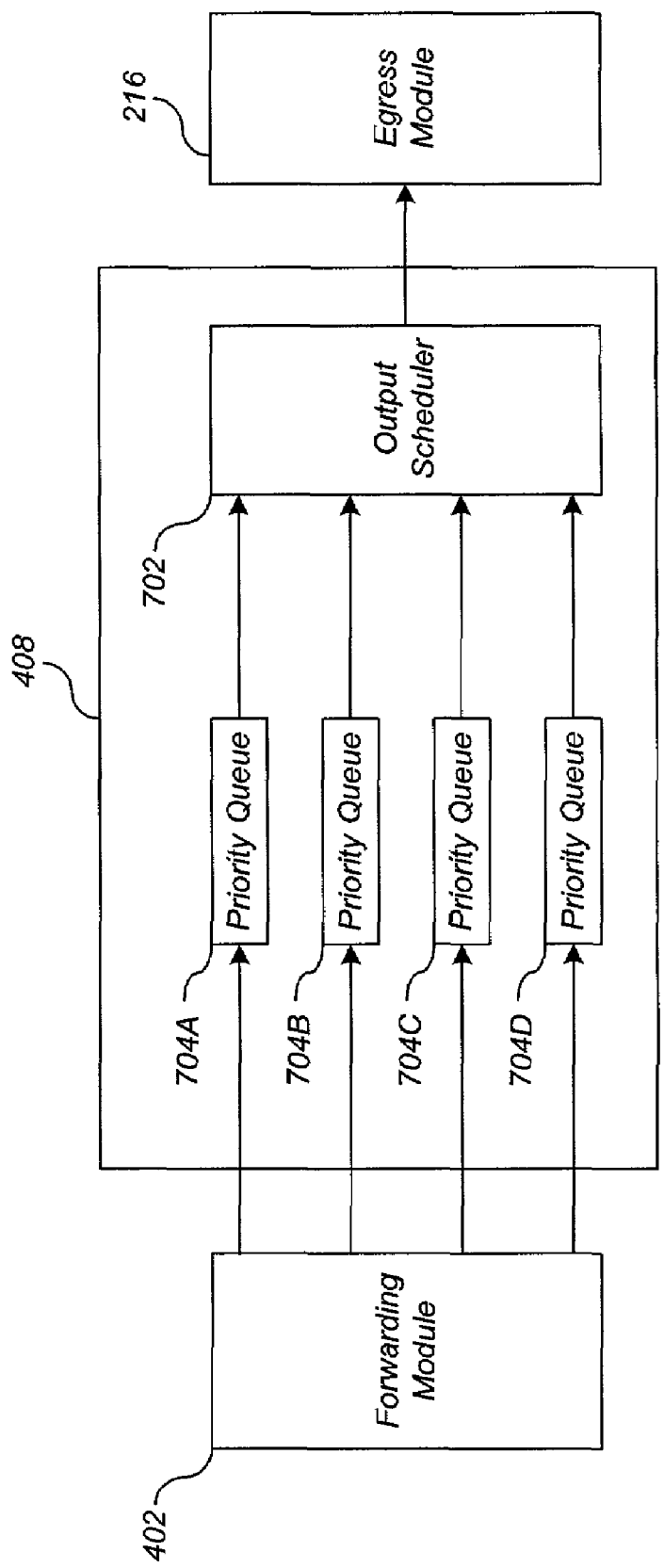
FIG. 7 is a block diagram of an output queue according to one implementation.

FIG. 7 is a block diagram of an output queue 408 according to one implementation. Output queue 408 includes an output scheduler 702 and four priority queues 704A, 704B, 704C, and 704D assigned to classes of service 3, 2, 1, and 0, respectively. Forwarding module 402 enqueues the pointers for each frame to a priority queue selected according to the class of service of the frame. For example, the pointers for a frame having class of service 2 are enqueued to priority queue 704B. Each egress module 216 can transmit only one frame at a time. Therefore output scheduler 702 selects one of the priority queues at a time based on a priority scheme that can be predetermined or selected by a user of the switch, such as a network administrator.

One priority scheme is strict priority. According to strict priority, higher-priority frames are always handled before lower-priority frames. Under this scheme, priority queue 704A transmits until it empties. Then priority queue 704B transmits until it empties, and so on.

Another priority scheme is weighted fair queuing. According to weighted fair queuing, frames are processed so that over time, higher-priority frames are transmitted more often than lower-priority frames according to a predetermined weighting scheme and sequence. One weighting scheme for four classes of service is "8-4-2-1." Of course, other weighting schemes can be used, as will be apparent to one skilled in the relevant art after reading this description.

According to 8-4-2-1 weighting, in 15 consecutive time units, 8 time units are allocated to class of service 3, 4 time units are allocated to class of service 2, 2 time units are allocated to class of service 1, and 1 time unit is allocated to class of service 0. In one implementation, the sequence shown in Table 1 is used with 8-4-2-1 weighting.

TABLE 1

| Time Unit | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Priority | 3 | 2 | 3 | 1 | 3 | 2 | 3 | 0 | 3 | 2 | 3 | 1 | 3 | 2 | 3 |

Thus when none of the priority queues are empty, the sequence of classes of service selected by output scheduler 702 is 3-2-3-1-3-2-3-0-3-2-3-1-3-2-3. When one of the priority queues is empty, its slots in the sequence are skipped. For example, if only priority queue 704A is empty, the sequence of classes of service output scheduler 702 is 2-1-2-0-2-1-2.

Free module 404 also employs a priority scheme in satisfying requests for pointers from reserve modules 406. In one implementation, free module 404 employs strict priority in satisfying these requests. In another implementation, free module 404 employs weighted fair queuing in satisfying these requests.

Figure 8:
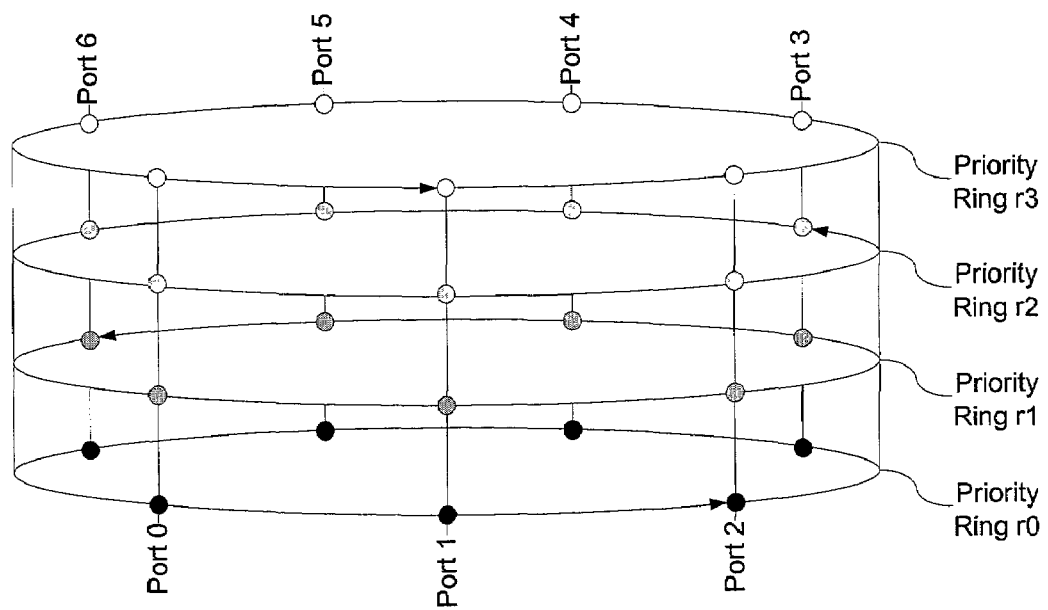
FIG. 8 depicts the logical structure of the process employed by a free module in allocating pointers to ports according to an implementation having 7 ports and 4 classes of service.

FIG. 8 depicts the logical structure 800 of the process employed by free module 404 in allocating pointers to ports according to an implementation having 7 ports and 4 classes of service. Each class of service has a ring. Class of service 0 has a ring r0. Class of service 1 has a ring r1. Class of service 2 has a ring r2. Class of service 3 has a ring r3. Each port has a station on each ring.

Although storing a frame may require multiple buffers, and therefore multiple pointers, free module 404 dispenses pointers to reserve modules 406 one at a time to keep allocation of the pointers both simple and fair. When a reserve module 406 is not full, it requests a pointer. The request includes a priority. In one implementation, the priority is the class of service of the last frame received by the port. In another implementation, the priority is the class of service of the last frame forwarded by the port.

Free module 404 first allocates the requests to the stations on structure 800, and then selects one of the rings to examine using a priority scheme such as weighted fair queuing. Within that ring, free module 404 selects a request by selecting one of the stations on the ring. Free module 404 remembers the last station serviced on each ring, and services the next one so that all stations on a ring are serviced sequentially. If a station has no request for pointers, free module 404 moves on to the next station on the ring. When a pointer has been dispensed to a station on a ring, free module 404 selects another ring according to the priority scheme. When no requests are pending, neither the priority sequence nor the sequential sequence advances. This process ensures that, within a single class of service, requests for free pointers are serviced evenly in a sequential fashion, and that between classes of service, requests for free pointers are serviced according to class of service. As a result, when the switch is congested, ports that receive and forward high-priority frames receive more free pointers. The sizes of the reserves lists for those ports do not decrease as rapidly as those of ports receiving low-priority frames. Therefore, over time, high-priority frames experience less latency than low-priority frames. When flow control is enabled, and the switch is congested, this process ensures that ports receiving high-priority frames assert flow control less often, and therefore handle more frames. Thus even with flow control enabled, the process implements quality of service.

In some implementations queue controller 400 implements quality of service when flow control is disabled. When flow control is disabled, switch 200 can refuse to store and forward frames. This refusal is also known as "discarding" frames or "dropping" frames. A frame is forwarded by enqueuing the pointers for that frame to an output queue. A frame is discarded by not enqueuing the pointers for that frame to an output queue, but instead keeping those pointers in the reserve module 406. In a multicast operation, where a frame is destined for multiple output queues, that frame may be enqueued to some of the output ports, but not enqueued to others of the output ports, as described below. When a switch discards a frame, some protocols at higher layers, such as transmission control protocol (TCP) detect and retransmit the discarded frame, while other protocols at higher layers, such as user datagram protocol (UDP), take no action.

In one implementation the decision to forward or discard a frame is based only on the number of pointers in the reserve module 406 of the port 202 that received the frame. In another implementation, this decision is based not only on the number of pointers in the reserve module 406 of the port 202 that received the frame, but also on the level of congestion on the channel to which the frame should be forwarded.

Figure 9A:
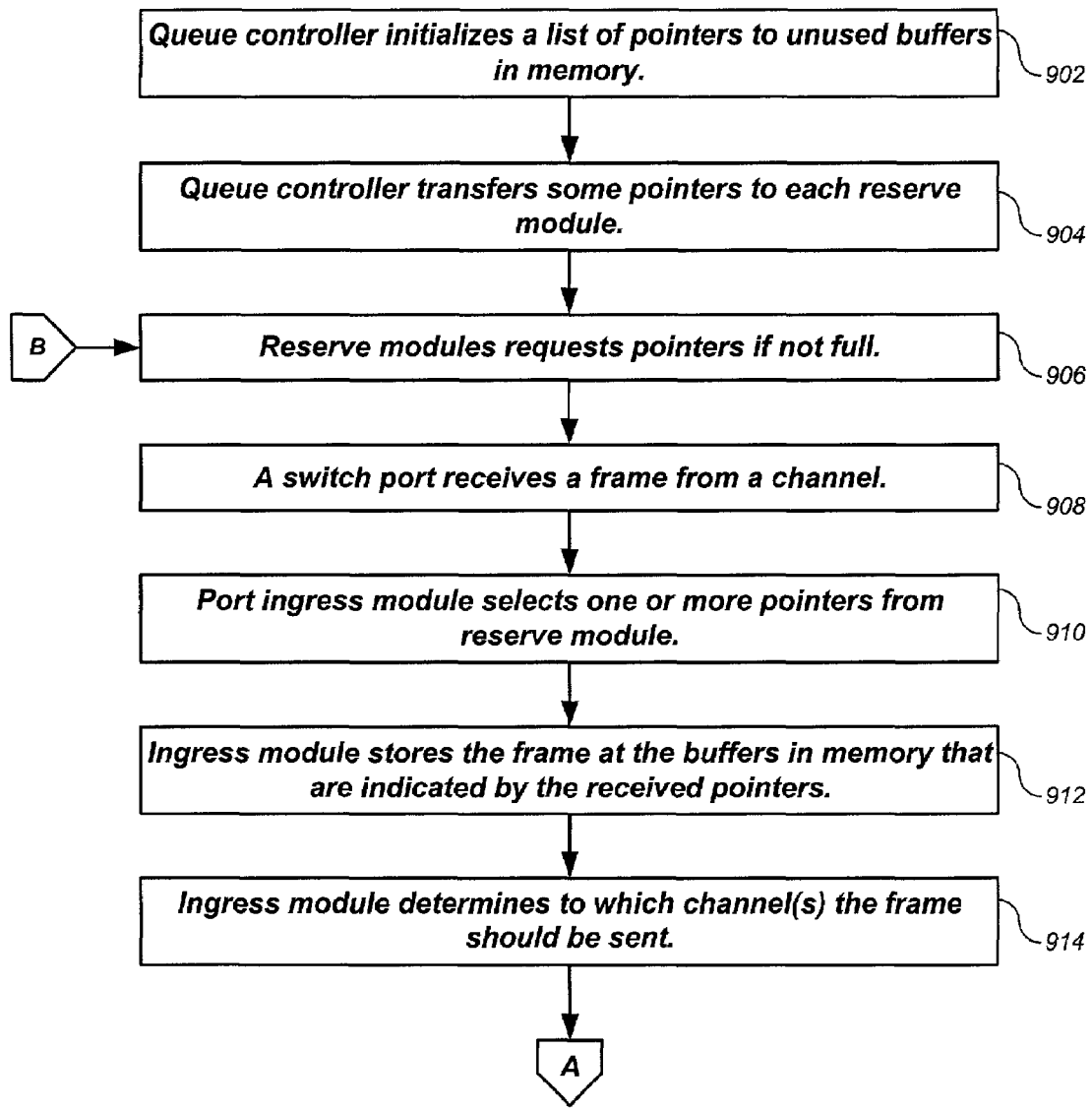
FIGS. 9A and 9B show a flowchart of a process of a network switch under control of a queue controller according to an implementation having flow control disabled, where the decision to forward or discard a frame is based only on the number of pointers in the reserve module of the port that received the frame.
Figure 9B:
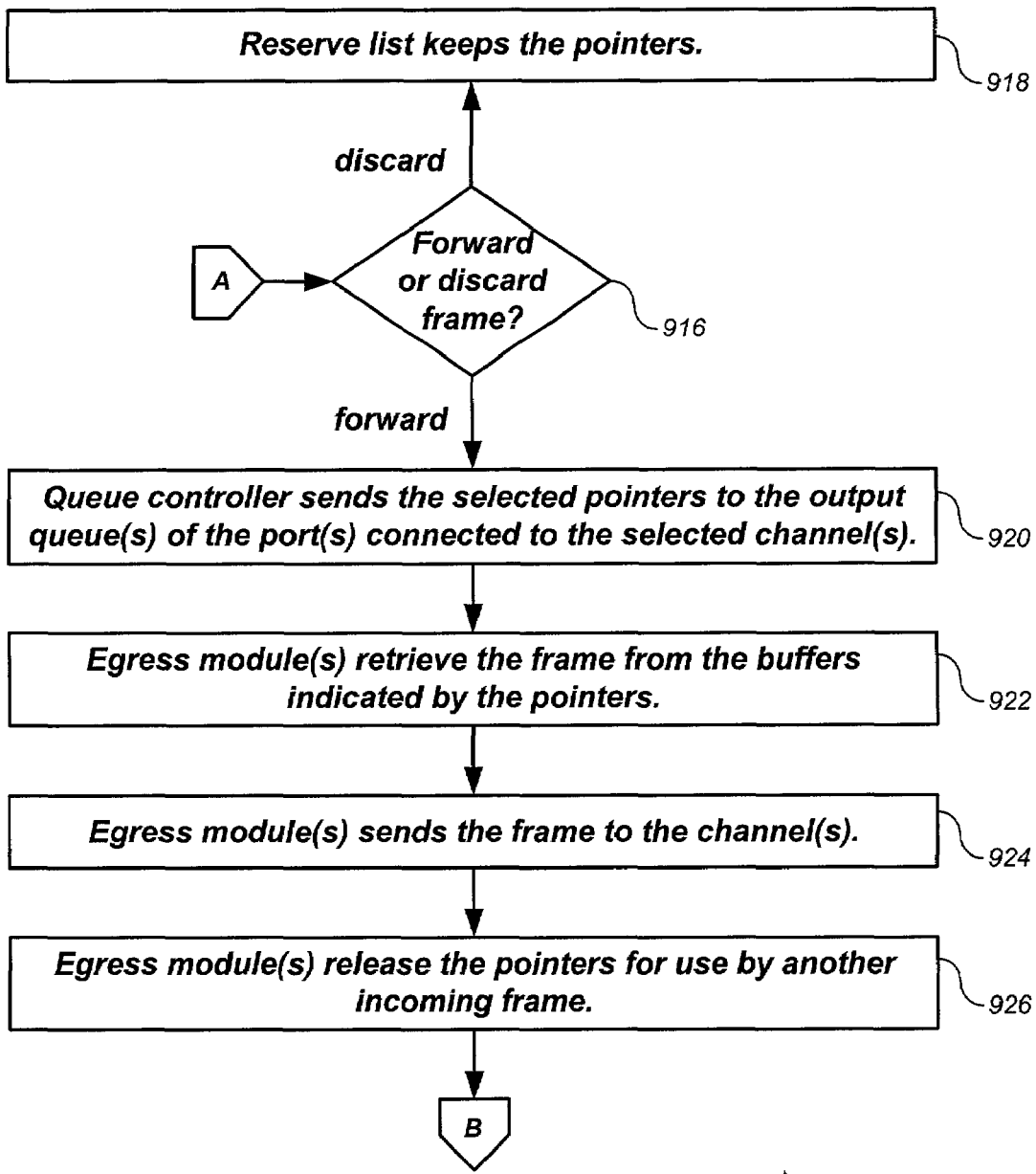

FIGS. 9A and 9B show a flowchart of a process 900 of a network switch such as switch 200 under control of queue controller 400 according to an implementation having flow control disabled, where the decision to forward or discard a frame is based only on the number of pointers in the reserve module 406 of the port 202 that received the frame. At power-on of switch 200, queue controller 400 initializes a free module 404 to contain a number of pointers to unused buffers in memory 208 (step 902). Queue controller 400 transfers some of these pointers to each reserve module (step 904). For example, queue controller 400 transfers a number of these pointers to a reserve module 314.

Each reserve module 406 includes a counter to count the number of pointers in the reserve module. When the number of pointers is below the capacity of the reserve module 406, the reserve module continually requests pointers from free module 404 (step 906).

A port 202 of switch 200 receives a frame from a channel 204 (step 908). The frame enters the port 202 connected to the channel 204 and traverses the PHY 210 and MAC 212 of the port 202 to reach the ingress module 214 of the port 202. Ingress module 214 selects one or more pointers from the reserve module 406 for the port 202 (step 910). Ingress module 214 stores the frame in memory 208 at the buffers that are indicated by the received pointers (step 912).

Ingress module 214 then determines to which channel (or channels in the case of a multicast operation) the frame should be sent, according to methods well-known in the relevant arts (step 914). Reserve module 406 then determines whether the frame should be forwarded or discarded based on the number of pointers in the reserve module 406 of the port 202 that received the frame (step 916).

Each reserve module 406 also implements a predetermined threshold for each class of service. A reserve module 406 drops a frame having a particular class of service when the number of pointers is less than the predetermined threshold for that class of service. When a frame is dropped, the reserve module 406 keeps the pointers for that frame (step 918).

A reserve module 406 forwards a frame having a particular class of service when the number of pointers is equal to, or greater than, the predetermined threshold for that class of service. Queue controller 206 sends the selected pointers to the output queues 408 for the ports connected to the selected channels (step 920). When the pointers for the frame reach the head of an output queue 408 of a port 202, the egress module 216 of the port retrieves the frame from the buffers indicated by the pointers (step 922) and sends the frame to their respective channels 204 (step 924). The output queue 408 then releases the pointers by returning them to free module 404 (step 926). Process 900 then resumes at step 906.

By gradually discarding frames based on class of service as the switch becomes more congested, process 900 effectively reserves more free buffers for frames having high classes of service. Therefore, process 900 serves to minimize the ingress latency for high-priority frames, in accordance with the objectives of quality of service.

Table 2 shows the thresholds, and their effects on each class of service, according to one implementation. In Table 2, the number of pointers in the reserve module is denoted as "size."

TABLE 2

| size | class of service 0 | class of service 1 | class of service 2 | class of service 3 |
|---|---|---|---|---|
| 13–19 | forward frame | forward frame | forward frame | forward frame |
| 10–12 | discard frame | forward frame | forward frame | forward frame |
| 7–9 | discard frame | discard frame | forward frame | forward frame |
| 4–6 | discard frame | discard frame | discard frame | forward frame |
| 0–3 | discard frame | discard frame | discard frame | discard frame |

An example of process 900 is now discussed with reference to FIG. 1. Device 104A has data to transmit to device 104B. Device 104A generates a frame of the data, and selects device 104B as the destination for the frame. Device 104A then sends the frame to channel 106A. The frame subsequently arrives at switch 102.

Switch 102 has a memory including a plurality of memory buffers m for storing a frame. The buffers include n available buffers and p unavailable buffers such that m=n+p. Switch 102 reserves q of the n buffers for channel 106A by sending q pointers to the reserve module for channel 106A. Switch 102 also reserves some of the remaining available buffers to other channels. For example, switch 102 reserves r of the n buffers for channel 106B by sending r pointers to the reserve module for channel 106B, where q+r≦n. When switch 102 receives the frame from channel 106A, it stores the frame in i of the q buffers, wherein $1 \leq i \leq q$, thereby changing the status of the i buffers to unavailable. In one implementation, $1 \leq i \leq 3$.

Switch 102 selectively assigns the frame to channel 106B (that is, determines whether to send the frame to channel 106B) based on a number s of the q buffers reserved to the first channel. In one implementation, the number s includes the number of buffers i used to store the frame, so s=q. In another implementation, the number s does not include the number of buffers i used to store the frame, so s=q−i.

If the number of buffers s is greater than or equal to the predetermined threshold for the class of service for the frame, switch 102 sends the frame to channel 106B and changes the status of the i buffers to available. Device 104B then receives the frame. But if the number of buffers s is less than the predetermined threshold for the class of service for the frame, switch 102 discards the frame and changes the status of the i buffers to available.

Figure 10:
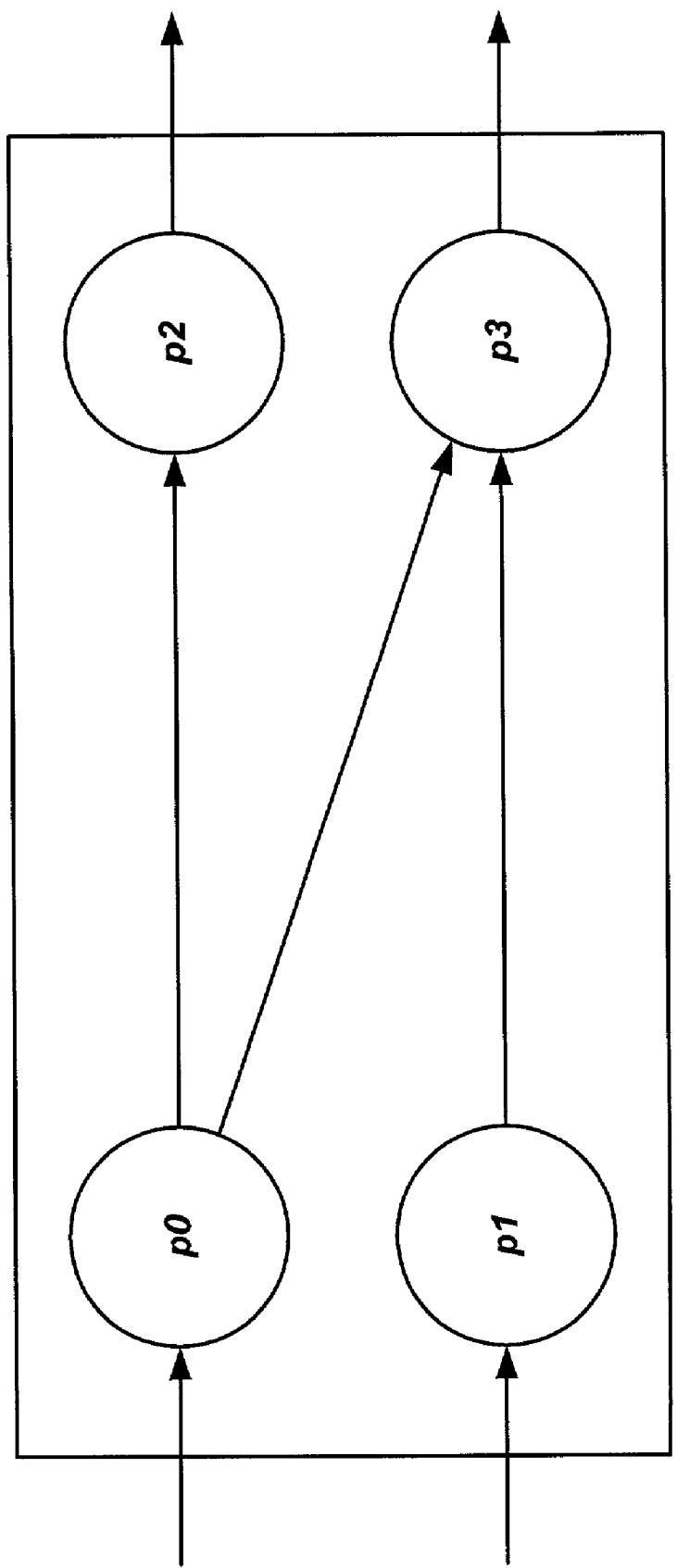
FIG. 10 shows four ports p0, p1, p2, and p3 in a switch to illustrate head-of-line blocking.

Some of the implementations that implement quality of service when flow control is disabled include an additional feature that solves a problem known as head-of-line blocking (HOLB). HOLB occurs when congested flows in a switch cause frames to be dropped from uncongested flows. Consider the following case, illustrated in FIG. 10, which shows four ports p0, p1, p2, and p3 in a switch 902. All of the ports run at 100 Mbps. However, HOLB is a problem with multiple of classes of service as well.

Port p1 sends all of its frames to port p3. Port p0 sends 50% of its frames to port p2, and sends the other 50% of its frames to port p3. Port p2 is uncongested. However, port p3 is congested because the amount of data arriving at port p3 is greater than the amount of data port p3 can transmit. In a conventional switch, the congestion at port p3 causes both ports p0 and p1 to begin dropping frames, including frames destined for uncongested port p2. For example, suppose the threshold for the forward/discard decision is 13, and that the size of the reserve module for port p0 is 13 when port p0 receives a class of service 0 frame destined for port p3. Because the size of the reserve module is equal to, or greater than, the threshold, switch 902 enqueues the frame to the priority queue for port p3. Assume that the frame required one buffer for storage. Therefore one pointer is removed from the reserve module of port p0. Assume that, due to congestion at port p3, no free pointers are available. Therefore the size of the reserve module drops to 12. Now assume a class of service 0 frame destined for port p2 arrives at port p0. Because the size of the reserve module is below threshold, that frame is discarded. Therefore a frame was dropped from the uncongested flow from port p0 to port p2 due to congestion at port p3.

In order to prevent HOLB, some implementations base the decision to forward or discard a frame not only on the level of pointers in the reserve module 406 of the port 202 that received the frame, but also on the level of congestion at the output port to which the frame is destined. According to these implementations, each reserve module 406 implements a pair of predetermined thresholds for each class of service. One of the pair is used when the output port to which the frame is destined is congested, and the other of the pair is used when the output port to which the frame is destined is uncongested. In one implementation, the level of congestion at an output port depends on the class of service. Referring to FIG. 7, each output queue 408 has 4 priority queues 704. Each priority queue 704 includes a counter that maintains a count of the number of pointers in the priority queue. Each priority queue 704 implements a predetermined threshold. When the number of pointers in a priority queue 704 is equal to, or greater than, the predetermined threshold, that priority queue is congested. In one implementation, the threshold is 12. Each priority queue 704 generates a congestion signal to inform the reserve modules 406 of the level of congestion in that priority queue. A reserve module 406 uses the congestion signal from a priority queue 704 to select the proper threshold for a class of service when making the decision whether to enqueue a frame of that class of service to that priority queue.

Table 3 shows the thresholds, and their effects on each class of service, according to one implementation. The thresholds are selected to provide three regions. In one region, all frames are forwarded for both congested and uncongested flows. In another region, all frames are discarded for both congested and uncongested flows. In the remaining region, the forward/discard decision is based on both reserve module size and output port congestion. The difference between thresholds in a pair is selected as the maximum number of buffers required to store a frame. In one implementation, the maximum number is 3. The size threshold below which all frames are discarded is selected as the maximum number of pointers required by a frame. In one implementation, the maximum number is 3. In Table 3, the number of pointers in the reserve module is denoted as "size."

TABLE 3

| size | when destination priority queue is uncongested, enqueue frames of: | when destination priority queue is congested, enqueue frames of: |
| --- | --- | --- |
| 16–19 | all classes of service | all classes of service |
| 13–15 | all classes of service | classes of service 3, 2, and 1 |
| 10–12 | classes of service 3, 2, and 1 | classes of service 3 and 2 |
| 7–9 | classes of service 3 and 2 | class of service 3 |
| 4–6 | class of service 3 | no classes of service |
| 0–3 | no classes of service | no classes of service |

The decision whether to enqueue a frame is made independently for each priority queue 704. Thus in a multicast operation, where a frame is destined for multiple priority queues 704, a reserve module 406 may enqueue the frame to some of the priority queues, but not to others. For example, consider a frame received on port 0 of a switch that is destined for ports 1, 2, 3, 4, 5, and 6 of the switch. The frame has class of service 0, the reserve module size for port 0 is 15, and the priority queues for class of service 0 are congested in ports 1, 3, and 5. Using the thresholds of Table 3, the switch would enqueue the frame only to ports 2, 4, and 6.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks;

magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A method for sending a frame of data from a first channel to a second channel using at least one of m memory buffers for storing a frame, m being at least 2, in which n of the m buffers have an available status and p of the m buffers have an unavailable status, wherein m=n+p, the method comprising:
   reserving q of the n buffers having the available status to the first channel;
   reserving r of the n buffers having the available status to the second channel, wherein q+r≦n;
   when a frame is received from the first channel, storing the frame in i of the q buffers, wherein 1≦i≦q, and changing status of the i buffers to unavailable;
   selectively assigning the frame to the second channel based on a number s of the q buffers, wherein s≦q; and wherein
   if the frame is assigned to the second channel, the frame is sent to the second channel from the i buffers and the status of the i buffers is changed to available; and
   if the frame is not assigned to the second channel, the frame is discarded and the status of the i buffers is changed to available.

2. The method of claim 1, wherein s=q.

3. The method of claim 1, wherein s=q−i.

4. The method of claim 2, wherein the selectively assigning step further comprises:
   selectively assigning the frame to the second channel based on a level of congestion on the second channel.

5. The method of claim 4, wherein the selectively assigning step further comprises:
   discarding the frame when the second channel is congested and the number of the s buffers is below a first threshold;
   discarding the frame when the second channel is not congested and the number of the s buffers is below a second threshold, wherein the first threshold is greater than the second threshold; and
   assigning the frame to the second channel when the number of the s buffers is equal to or greater than the first threshold.

6. The method of claim 4, wherein each frame has one of a plurality of classes of service, wherein each class of service has associated therewith first and second predetermined thresholds, and wherein the selectively assigning step further comprises:
   discarding the frame when the second channel is congested and the number of the s buffers is below the first predetermined threshold of the associated class of service of the frame;
   discarding the frame when the second channel is not congested and the number of the s buffers is below the second predetermined threshold of the associated class of service of the frame, wherein the first predetermined threshold of the associated class of service of the frame is greater than the second predetermined threshold of the associated class of service of the frame; and
   assigning the frame to the second channel when the number of the s buffers is equal to or greater than the first predetermined threshold of the associated class of service of the frame.

7. The method of claim 4, wherein each frame has one of a plurality of classes of service associated therewith, and wherein the step of reserving q of the n buffers comprises:
   reserving the q available buffers for the first channel based on one of the classes of service associated with a frame received from the first channel.

8. The method of claim 7, wherein the q available buffers are reserved for the first channel based on the one class of service of a last frame received from the first channel.

9. The method of claim 5, wherein a first port is associated with the first channel and a second port is associated with the second channel, and wherein the assigning step comprises:
   sending, to the second port, the identity of the i buffers storing the frame.

10. The method of claim 4, wherein a first port is associated with the first channel and a second port is associated with the second channel, further comprising:
    receiving, at the first port, a frame from the first channel;
    storing the frame in i of the q buffers;
    changing the status of the i buffers to unavailable;
    sending, to the second port, the identity of the i buffers storing the frame;
    retrieving, at the second port, the frame using the identity of the i buffers storing the frame;
    sending the frame to the second channel; and
    changing the status of the i buffers to available.

11. Computer-readable media embodying instructions executable by a computer to perform a method for sending a frame of data from a first channel to a second channel using at least one of m memory buffers for storing a frame, m being at least 2, in which n of the m buffers have an available status and p of the m buffers have an unavailable status, wherein m=n+p, the method comprising:
    reserving q of the n buffers having the available status to the first channel;
    reserving r of the n buffers having the available status to the second channel, wherein q+r≦n;
    when a frame is received from the first channel, storing the frame in i of the q buffers, wherein 1≦i≦q, and changing status of the i buffers to unavailable;
    selectively assigning the frame to the second channel based on a number s of the q buffers, wherein s≦q; and wherein
    if the frame is assigned to the second channel, the frame is sent to the second channel from the i buffers and the status of the i buffers is changed to available; and
    if the frame is not assigned to the second channel, the frame is discarded and the status of the i buffers is changed to available.

12. The media of claim 11, wherein s=q.

13. The media of claim 11, wherein s=q−i.

14. The media of claim 12, wherein the selectively assigning step further comprises:
    selectively assigning the frame to the second channel based on a level of congestion on the second channel.

15. The media of claim 14, wherein the selectively assigning step further comprises:
    discarding the frame when the second channel is congested and the number of the s buffers is below a first threshold;
    discarding the frame when the second channel is not congested and the number of the s buffers is below a second threshold, wherein the first threshold is greater than the second threshold; and assigning the frame to the second channel when the number of the s buffers is equal to or greater than the first threshold.

16. The media of claim 14, wherein each frame has one of a plurality of classes of service, wherein each class of service has associated therewith first and second predetermined thresholds, and wherein the selectively assigning step further comprises:
discarding the frame when the second channel is congested and the number of the s buffers is below the first predetermined threshold of the associated class of service of the frame;
discarding the frame when the second channel is not congested and the number of the s buffers is below the second predetermined threshold of the associated class of service of the frame, wherein the first predetermined threshold of the associated class of service of the frame is greater than the second predetermined threshold of the associated class of service of the frame; and
assigning the frame to the second channel when the number of the s buffers is equal to or greater than the first predetermined threshold of the associated class of service of the frame.

17. The media of claim 14, wherein each frame has one of a plurality of classes of service associated therewith, and wherein the step of reserving q of the n buffers comprises:
reserving the q available buffers for the first channel based on one of the classes of service associated with a frame received from the first channel.

18. The media of claim 17, wherein the q available buffers are reserved for the first channel based on the one class of service of a last frame received from the first channel.

19. The media of claim 15, wherein a first port is associated with the first channel and a second port is associated with the second channel, and wherein the assigning step comprises:
sending, to the second port, the identity of the i buffers storing the frame.

20. The media of claim 14, wherein a first port is associated with the first channel and a second port is associated with the second channel, wherein the method further comprises:
receiving, at the first port, a frame from the first channel;
storing the frame in i of the q buffers;
changing the status of the i buffers to unavailable;
sending, to the second port, the identity of the i buffers storing the frame;
retrieving, at the second port, the frame using the identity of the i buffers storing the frame;
sending the frame to the second channel; and
changing the status of the i buffers to available.

21. An apparatus for sending a frame of data from a first channel to a second channel using at least one of m memory buffers for storing a frame, m being at least 2, in which n of the m buffers have an available status and p of the m buffers have an unavailable status, wherein m=n+p, the apparatus comprising:
first reservation means for reserving q of the n buffers having the available status to the first channel;
second reservation means for reserving r of the n buffers having the available status to the second channel, wherein $q+r \leq n$;
store means for, when a frame is received from the first channel, storing the frame in i of the q buffers, wherein $1 \leq i \leq q$, and changing status of the i buffers to unavailable;
assigning means for selectively assigning the frame to the second channel based on a number s of the q buffers, wherein $s \leq q$; and wherein
if the frame is assigned to the second channel, the frame is sent to the second channel from the i buffers and the status of the i buffers is changed to available; and
if the frame is not assigned to the second channel, the frame is discarded and the status of the i buffers is changed to available.

22. The apparatus of claim 21, wherein s=q.

23. The apparatus of claim 21, wherein s=q−i.

24. The apparatus of claim 22, wherein the assigning means further comprises:
means for selectively assigning the frame to the second channel based on a level of congestion on the second channel.

25. The apparatus of claim 24, wherein the assigning means further comprises:
means for discarding the frame when the second channel is congested and the number of the s buffers is below a first threshold;
means for discarding the frame when the second channel is not congested and the number of the s buffers is below a second threshold, wherein the first threshold is greater than the second threshold; and
means for assigning the frame to the second channel when the number of the s buffers is equal to or greater than the first threshold.

26. The apparatus of claim 24, wherein each frame has one of a plurality of classes of service, wherein each class of service has associated therewith first and second predetermined thresholds, and wherein the assigning means further comprises:
means for discarding the frame when the second channel is congested and the number of the s buffers is below the first predetermined threshold of the associated class of service of the frame;
means for discarding the frame when the second channel is not congested and the number of the s buffers is below the second predetermined threshold of the associated class of service of the frame, wherein the first predetermined threshold of the associated class of service of the frame is greater than the second predetermined threshold of the associated class of service of the frame; and
means for assigning the frame to the second channel when the number of the s buffers is equal to or greater than the first predetermined threshold of the associated class of service of the frame.

27. The apparatus of claim 24, wherein each frame has one of a plurality of classes of service associated therewith, and wherein the first reservation means comprises:
means for reserving the q available buffers for the first channel based on one of the classes of service associated with a frame received from the first channel.

28. The apparatus of claim 27, wherein the q available buffers are reserved for the first channel based on the one class of service of a last frame received from the first channel.

29. The apparatus of claim 25, wherein a first port is associated with the first channel and a second port is associated with the second channel, and wherein the means for assigning comprises:

means for sending, to the second port, the identity of the i buffers storing the frame.

30. The apparatus of claim 24, wherein a first port is associated with the first channel and a second port is associated with the second channel, further comprising:
   receive means for receiving, at the first port, a frame from the first channel;
   further store means for storing the frame in i of the q buffers;
   first change means for changing the status of the i buffers to unavailable;
   first send means for sending, to the second port, the identity of the i buffers storing the frame;
   retrieve means for retrieving, at the second port, the frame using the identity of the i buffers storing the frame;
   second send means for sending the frame to the second channel; and
   second change means for changing the status of the i buffers to available.

31. An apparatus for sending a frame of data from a first channel to a second channel, comprising:
   a memory having m memory buffers for storing a frame, m being at least 2, in which n of the m buffers have an available status and p of the m buffers have an unavailable status, wherein m=n+p;
   a queue controller to reserve q of the n buffers having the available status to the first channel, and to reserve r of the n buffers having the available status to the second channel, wherein q+r≦n; and
   an ingress module to, when a frame is received from the first channel, store the frame in i of the q buffers, wherein 1≦i≦q, and changes status of the i buffers to unavailable; and wherein
   the queue controller selectively assigns the frame to the second channel based on a number s of the q buffers, wherein s≦q;
   if the frame is assigned to the second channel, the frame is sent to the second channel from the i buffers and the status of the i buffers is changed to available; and
   if the frame is not assigned to the second channel, the frame is discarded and the status of the i buffers is changed to available.

32. The apparatus of claim 31, wherein s=q.

33. The apparatus of claim 31, wherein s=q−i.

34. The apparatus of claim 32, wherein the queue controller selectively assigns the frame to the second channel based on a level of congestion on the second channel.

35. The apparatus of claim 34, wherein the queue controller:
   discards the frame when the second channel is congested and the number of the s buffers is below a first threshold;
   discards the frame when the second channel is not congested and the number of the s buffers is below a second threshold, wherein the first threshold is greater than the second threshold; and
   assigns the frame to the second channel when the number of the s buffers is equal to or greater than the first threshold.

36. The apparatus of claim 34, wherein each frame has one of a plurality of classes of service, wherein each class of service has associated therewith first and second predetermined thresholds, and wherein the queue controller:
   discards the frame when the second channel is congested and the number of the s buffers is below the first predetermined threshold of the associated class of service of the frame;
   discards the frame when the second channel is not congested and the number of the s buffers is below the second predetermined threshold of the associated class of service of the frame, wherein the first predetermined threshold of the associated class of service of the frame is greater than the second predetermined threshold of the associated class of service of the frame; and
   assigns the frame to the second channel when the number of the s buffers is equal to or greater than the first predetermined threshold of the associated class of service of the frame.

37. The apparatus of claim 34, wherein each frame has one of a plurality of classes of service associated therewith, and wherein the queue controller:
   reserves the q available buffers for the first channel based on one of the classes of service associated with a frame received from the first channel.

38. The apparatus of claim 37, wherein the q available buffers are reserved for the first channel based on the one class of service of a last frame received from the first channel.

39. The apparatus of claim 35, further comprising:
   a first port associated with the first channel; and
   a second port associated with the second channel; and wherein the queue controller sends, to the second port, the identity of the i buffers storing the frame.

40. The apparatus of claim 34, further comprising:
   a first port to receive a frame from the first channel; and
   a second port associated with the second channel; and wherein the queue controller receives, at the first port, a frame from the first channel, stores the frame in i of the q buffers; changes the status of the i buffers to unavailable; sends, to the second port, the identity of the i buffers storing the frame; retrieves, at the second port, the frame using the identity of the i buffers storing the frame; sends the frame to the second channel; and changes the status of the i buffers to available.

41. A method for sending a frame of data from a first device to a second device through a network switch having m memory buffers for storing a frame, m being at least 2, in which n of the m buffers have an available status and p of the m buffers have an unavailable status, wherein m=n+p, wherein the first device is connected to the network switch by a first channel and the second device is connected to the network switch by a second channel, the method comprising:
   selecting, by the first device, the second device as a destination for the frame;
   sending, by the first device, the frame to the first channel;
   reserving q of the n buffers having the available status to the first channel;
   reserving r of the n buffers having the available status to the second channel, wherein q+r≦n;
   when the frame is received from the first channel, storing the frame in i of the q buffers, wherein 1≦i≦q, and changing status of the i buffers to unavailable;
   selectively assigning the frame to the second channel based on a number s of the q buffers, wherein s≦q;
   wherein if the frame is assigned to the second channel, the frame is sent to the second channel from the i buffers and the status of the i buffers is changed to available; and
   wherein if the frame is not assigned to the second channel, the frame is discarded and the status of the i buffers is changed to available; and receiving, by the second device, the frame from the second channel if the frame is assigned to the second channel.

42. The method of claim 41, wherein s=q.

43. The method of claim 41, wherein s=q−i.

44. The method of claim 42, wherein the selectively assigning step further comprises:
selectively assigning the frame to the second channel based on a level of congestion on the second channel.

45. The method of claim 44, wherein the selectively assigning step further comprises:
discarding the frame when the second channel is congested and the number of the s buffers is below a first threshold;
discarding the frame when the second channel is not congested and the number of the s buffers is below a second threshold, wherein the first threshold is greater than the second threshold; and
assigning the frame to the second channel when the number of the s buffers is equal to or greater than the first threshold.

46. The method of claim 44, wherein each frame has one of a plurality of classes of service, wherein each class of service has associated therewith first and second predetermined thresholds, and wherein the selectively assigning step further comprises:
discarding the frame when the second channel is congested and the number of the s buffers is below the first predetermined threshold of the associated class of service of the frame;
discarding the frame when the second channel is not congested and the number of the s buffers is below the second predetermined threshold of the associated class of service of the frame, wherein the first predetermined threshold of the associated class of service of the frame is greater than the second predetermined threshold of the associated class of service of the frame; and
assigning the frame to the second channel when the number of the s buffers is equal to or greater than the first predetermined threshold of the associated class of service of the frame.

47. The method of claim 44, wherein each frame has one of a plurality of classes of service associated therewith, and wherein the step of reserving q of the n buffers comprises:
reserving the q available buffers for the first channel based on one of the classes of service associated with a frame received from the first channel.

48. The method of claim 47, wherein the q available buffers are reserved for the first channel based on the one class of service of a last frame received from the first channel.

49. The method of claim 45, wherein a first port is associated with the first channel and a second port is associated with the second channel, and wherein the assigning step comprises:
sending, to the second port, the identity of the i buffers storing the frame.

50. The method of claim 44, wherein a first port is associated with the first channel and a second port is associated with the second channel, further comprising:
receiving, at the first port, a frame from the first channel;
storing the frame in i of the q buffers;
changing the status of the i buffers to unavailable;
sending, to the second port, the identity of the i buffers storing the frame;
retrieving, at the second port, the frame using the identity of the i buffers storing the frame;
sending the frame to the second channel; and
changing the status of the i buffers to available.

51. Computer-readable media embodying instructions executable by a computer to perform a method for sending a frame of data from a first device to a second device through a network switch having m memory buffers for storing a frame, m being at least 2, in which n of the m buffers have an available status and p of the m buffers have an unavailable status, wherein m=n+p, wherein the first device is connected to the network switch by a first channel and the second device is connected to the network switch by a second channel, the method comprising:
selecting, by the first device, the second device as a destination for the frame;
sending, by the first device, the frame to the first channel;
reserving q of the n buffers having the available status to the first channel;
reserving r of the n buffers having the available status to the second channel, wherein q+r≦n;
when the frame is received from the first channel, storing the frame in i of the q buffers, wherein 1≦i≦q, and changing status of the i buffers to unavailable;
selectively assigning the frame to the second channel based on a number s of the q buffers, wherein s≦q;
wherein if the frame is assigned to the second channel, the frame is sent to the second channel from the i buffers and the status of the i buffers is changed to available; and
wherein if the frame is not assigned to the second channel, the frame is discarded and the status of the i buffers is changed to available; and
receiving, by the second device, the frame from the second channel if the frame is assigned to the second channel.

52. The media of claim 51, wherein s=q.

53. The media of claim 51, wherein s=q−i.

54. The media of claim 52, wherein the selectively assigning step further comprises:
selectively assigning the frame to the second channel based on a level of congestion on the second channel.

55. The media of claim 54, wherein the selectively assigning step further comprises:
discarding the frame when the second channel is congested and the number of the s buffers is below a first threshold;
discarding the frame when the second channel is not congested and the number of the s buffers is below a second threshold, wherein the first threshold is greater than the second threshold; and
assigning the frame to the second channel when the number of the s buffers is equal to or greater than the first threshold.

56. The media of claim 54, wherein each frame has one of a plurality of classes of service, wherein each class of service has associated therewith first and second predetermined thresholds, and wherein the selectively assigning step further comprises:
discarding the frame when the second channel is congested and the number of the s buffers is below the first predetermined threshold of the associated class of service of the frame;
discarding the frame when the second channel is not congested and the number of the s buffers is below the second predetermined threshold of the associated class of service of the frame, wherein the first predetermined threshold of the associated class of service of the frame is greater than the second predetermined threshold of the associated class of service of the frame; and assigning the frame to the second channel when the number of the s buffers is equal to or greater than the first predetermined threshold of the associated class of service of the frame.

57. The media of claim 54, wherein each frame has one of a plurality of classes of service associated therewith, and wherein the step of reserving q of the n buffers comprises:

reserving the q available buffers for the first channel based on one of the classes of service associated with a frame received from the first channel.

58. The media of claim 57, wherein the q available buffers are reserved for the first channel based on the one class of service of a last frame received from the first channel.

59. The media of claim 55, wherein a first port is associated with the first channel and a second port is associated with the second channel, and wherein the assigning step comprises:

sending, to the second port, the identity of the i buffers storing the frame.

60. The media of claim 54, wherein a first port is associated with the first channel and a second port is associated with the second channel, wherein the method further comprises:

receiving, at the first port, a frame from the first channel;
storing the frame in i of the q buffers;
changing the status of the i buffers to unavailable;
sending, to the second port, the identity of the i buffers storing the frame;
retrieving, at the second port, the frame using the identity of the i buffers storing the frame;
sending the frame to the second channel; and
changing the status of the i buffers to available.

61. An apparatus for sending a frame of data from a first device to a second device through a network switch having m memory buffers for storing a frame, m being at least 2, in which n of the m buffers have an available status and p of the m buffers have an unavailable status, wherein m=n+p, wherein the first device is connected to the network switch by a first channel and the second device is connected to the network switch by a a second channel, the apparatus comprising:

select means for selecting, by the first device, the second device as a destination for the frame;
send means for sending, by the first device, the frame to the first channel;
first reservation means for reserving q of the n buffers having the available status to the first channel;
second reservation means for reserving r of the n buffers having the available status to the second channel, wherein q+r≦r;
store means for when the frame is received from the first channel, storing the frame in i of the q buffers, wherein 1≦i≦q, and changing status of the i buffers to unavailable;
assigning means for selectively assigning the frame to the second channel based on a number s of the q buffers, wherein s≦q;
wherein if the frame is assigned to the second channel, the frame is sent to the second channel from the i buffers and the status of the i buffers is changed to available; and
wherein if the frame is not assigned to the second channel, the frame is discarded and the status of the i buffers is changed to available; and receiving means for receiving, by the second device, the frame from the second channel if the frame is assigned to the second channel.

62. The apparatus of claim 61, wherein s=q.

63. The apparatus of claim 61, wherein s=q−i.

64. The apparatus of claim 62, wherein the assigning means further comprises:

means for selectively assigning the frame to the second channel based on a level of congestion on the second channel.

65. The apparatus of claim 64, wherein the assigning means further comprises:

means for discarding the frame when the second channel is congested and the number of the s buffers is below a first threshold;
means for discarding the frame when the second channel is not congested and the number of the s buffers is below a second threshold, wherein the first threshold is greater than the second threshold; and
means for assigning the frame to the second channel when the number of the s buffers is equal to or greater than the first threshold.

66. The apparatus of claim 64, wherein each frame has one of a plurality of classes of service, wherein each class of service has associated therewith first and second predetermined thresholds, and wherein the assigning means further comprises:

means for discarding the frame when the second channel is congested and the number of the s buffers is below the first predetermined threshold of the associated class of service of the frame;
means for discarding the frame when the second channel is not congested and the number of the s buffers is below the second predetermined threshold of the associated class of service of the frame, wherein the first predetermined threshold of the associated class of service of the frame is greater than the second predetermined threshold of the associated class of service of the frame; and
means for assigning the frame to the second channel when the number of the s buffers is equal to or greater than the first predetermined threshold of the associated class of service of the frame.

67. The apparatus of claim 64, wherein each frame has one of a plurality of classes of service associated therewith, and wherein the first reservation means comprises:

means for reserving the q available buffers for the first channel based on one of the classes of service associated with a frame received from the first channel.

68. The apparatus of claim 67, wherein the q available buffers are reserved for the first channel based on the one class of service of a last frame received from the first channel.

69. The apparatus of claim 65, wherein a first port is associated with the first channel and a second port is associated with the second channel, and wherein the means for assigning comprises:

means for sending, to the second port, the identity of the i buffers storing the frame.

70. The apparatus of claim 64, wherein a first port is associated with the first channel and a second port is associated with the second channel, further comprising:

receiver means for receiving, at the first port, a frame from the first channel;
further store means for storing the frame in i of the q buffers;

first change means for changing the status of the i buffers to unavailable;
first send means for sending, to the second port, the identity of the i buffers storing the frame;
retrieve means for retrieving, at the second port, the frame using the identity of the i buffers storing the frame;
second send means for sending the frame to the second channel; and
second change means for changing the status of the i buffers to available.

71. A network comprising:
a network switch having m memory buffers for storing a frame of data, m being at least 2, in which n of the m buffers have an available status and p of the m buffers have an unavailable status, wherein m=n+p;
a first device connected to the network switch by a first channel;
a second device connected to the network switch by a second channel;
wherein the first device selects the second device as a destination for the frame and sends the frame to the first channel;
wherein the network switch reserves q of the n buffers having the available status to the first channel, and reserves r of the n buffers having the available status to the second channel, wherein $q+r \leq n$;
wherein when the frame is received from the first channel, the network switch stores the frame in i of the q buffers, wherein $1 \leq i \leq q$, and changes status of the i buffers to unavailable; and
wherein the network switch selectively assigns the frame to the second channel based on a number s of the q buffers, wherein $s \leq q$;
wherein if the frame is assigned to the second channel, the frame is sent to the second channel from the i buffers and the status of the i buffers is changed to available; and
wherein if the frame is not assigned to the second channel, the frame is discarded and the status of the i buffers is changed to available; and
wherein the second device receives the frame from the second channel if the frame is assigned to the second channel.

72. The network of claim 71, wherein s=q.

73. The network of claim 71, wherein s=q−i.

74. The network of claim 72, wherein the network switch selectively assigns the frame to the second channel based on a level of congestion on the second channel.

75. The network of claim 74, wherein the network switch:
discards the frame when the second channel is congested and the number of the s buffers is below a first threshold;
discards the frame when the second channel is not congested and the number of the s buffers is below a second threshold, wherein the first threshold is greater than the second threshold; and
assigns the frame to the second channel when the number of the s buffers is equal to or greater than the first threshold.

76. The network of claim 74, wherein each frame has one of a plurality of classes of service, wherein each class of service has associated therewith first and second predetermined thresholds, and wherein the network switch:
discards the frame when the second channel is congested and the number of the s buffers is below the first predetermined threshold of the associated class of service of the frame;
discards the frame when the second channel is not congested and the number of the s buffers is below the second predetermined threshold of the associated class of service of the frame, wherein the first predetermined threshold of the associated class of service of the frame is greater than the second predetermined threshold of the associated class of service of the frame; and
assigns the frame to the second channel when the number of the s buffers is equal to or greater than the first predetermined threshold of the associated class of service of the frame.

77. The network of claim 74, wherein each frame has one of a plurality of classes of service associated therewith, and wherein the network switch reserves the q available buffers for the first channel based on one of the classes of service associated with a frame received from the first channel.

78. The network of claim 77, wherein the q available buffers are reserved for the first channel based on the one class of service of a last frame received from the first channel.

79. The network of claim 75, wherein the network switch comprises:
a first port associated with the first channel;
a second port associated with the second channel; and
a queue controller to send, to the second port, the identity of the i buffers storing the frame.

80. The network of claim 74, wherein the network switch comprises:
a first port to receive a frame from the first channel;
a second port associated with the second channel; and
a queue controller to receive, at the first port, a frame from the first channel, stores the frame in i of the q buffers; changes the status of the i buffers to unavailable; sends, to the second port, the identity of the i buffers storing the frame; retrieves, at the second port, the frame using the identity of the i buffers storing the frame; sends the frame to the second channel; and changes the status of the i buffers to available.

81. A method for sending a frame of data from a first channel to a second channel using at least one of m memory buffers for storing a frame, m being at least 2, in which n of the m buffers have an available status and p of the m buffers have an unavailable status, wherein m=n+p, the method comprising:
reserving q of the n buffers having the available status to the first channel;
reserving r of the n buffers having the available status to the second channel, wherein $q+r \leq n$;
when a frame is received from the first channel, storing the frame in i of the q buffers, wherein $1 \leq i \leq q$, and changing status of the i buffers to unavailable;
sending the frame to the second channel and changing the status of the i buffers to available; and
exercising flow control on the first channel when a number s of the q buffers is below a predetermined threshold, wherein $s \leq q$.

82. The method of claim 81, wherein s=q.

83. The method of claim 81, wherein s=q−i.

84. The method of claim 82, further comprising:
terminating flow control on the first channel when the number of s buffers is above a second predetermined threshold.

85. The method of claim 82, wherein each frame has one of a plurality of classes of service associated therewith, and wherein the step of reserving q of the n buffers comprises:

reserving the q available buffers for the first channel based on one of the classes of service associated with a frame received from the first channel.

86. The method of claim 85, wherein the q available buffers are reserved for the first channel based on the one class of service of a last frame received from the first channel.

87. The method of claim 84, wherein a first port is associated with the first channel and a second port is associated with the second channel, and wherein the assigning step comprises:
sending, to the second port, the identity of the i buffers storing the frame.

88. The method of claim 82, wherein a first port is associated with the first channel and a second port is associated with the second channel, further comprising:
receiving, at the first port, a frame from the first channel;
storing the frame in i of the q buffers;
changing the status of the i buffers to unavailable;
sending, to the second port, the identity of the i buffers storing the frame;
retrieving, at the second port, the frame using the identity of the i buffers storing the frame;
sending the frame to the second channel; and
changing the status of the i buffers to available.

89. The method of claim 82, wherein the exercising step comprises:
sending a pause frame to the first channel.

90. The method of claim 84, wherein the terminating step comprises:
sending a pause release frame to the first channel.

91. Computer-readable media embodying instructions executable by a computer to perform a method for sending a frame of data from a first channel to a second channel using at least one of m memory buffers for storing a frame, m being at least 2, in which n of the m buffers have an available status and p of the m buffers have an unavailable status, wherein m=n+p, the method comprising:
reserving q of the n buffers having the available status to the first channel;
reserving r of the n buffers having the available status to the second channel, wherein q+r≦n;
when a frame is received from the first channel, storing the frame in i of the q buffers, wherein 1≦i≦q, and changing status of the i buffers to unavailable;
sending the frame to the second channel and changing the status of the i buffers to available; and
exercising flow control on the first channel when a number s of the q buffers is below a predetermined threshold, wherein s≦q.

92. The media of claim 91, wherein s=q.

93. The media of claim 91, wherein s=q−i.

94. The media of claim 92, wherein the method further comprises:
terminating flow control on the first channel when the number of s buffers is above a second predetermined threshold.

95. The media of claim 92, wherein each frame has one of a plurality of classes of service associated therewith, and wherein the step of reserving q of the n buffers comprises:
reserving the q available buffers for the first channel based on one of the classes of service associated with a frame received from the first channel.

96. The media of claim 95, wherein the q available buffers are reserved for the first channel based on the one class of service of a last frame received from the first channel.

97. The media of claim 94, wherein a first port is associated with the first channel and a second port is associated with the second channel, and wherein the assigning step comprises:
sending, to the second port, the identity of the i buffers storing the frame.

98. The media of claim 92, wherein a first port is associated with the first channel and a second port is associated with the second channel, wherein the method further comprises:
receiving, at the first port, a frame from the first channel;
storing the frame in i of the q buffers;
changing the status of the i buffers to unavailable;
sending, to the second port, the identity of the i buffers storing the frame;
retrieving, at the second port, the frame using the identity of the i buffers storing the frame;
sending the frame to the second channel; and
changing the status of the i buffers to available.

99. The media of claim 92, wherein the exercising step comprises:
sending a pause frame to the first channel.

100. The media of claim 94, wherein the terminating step comprises:
sending a pause release frame to the first channel.

101. An apparatus for sending a frame of data from a first channel to a second channel using at least one of m memory buffers for storing a frame, m being at least 2, in which n of the m buffers have an available status and p of the m buffers have an unavailable status, wherein m=n+p, the apparatus comprising:
first reservation means for reserving q of the n buffers having the available status to the first channel;
second reservation means for reserving r of the n buffers having the available status to the second channel, wherein q+r≦n;
store means for, when a frame is received from the first channel, storing the frame in i of the q buffers, wherein 1≦i≦q, and changing status of the i buffers to unavailable;
send means for sending the frame to the second channel and changing the status of the i buffers to available; and
exercising means for exercising flow control on the first channel when a number s of the q buffers is below a predetermined threshold, wherein s≦q.

102. The apparatus of claim 101, wherein s=q.

103. The apparatus of claim 101, wherein s=q−i.

104. The apparatus of claim 102, further comprising:
means for terminating flow control on the first channel when the number of s buffers is above a second predetermined threshold.

105. The apparatus of claim 102, wherein each frame has one of a plurality of classes of service associated therewith, and wherein the first reservation means comprises:
means for reserving the q available buffers for the first channel based on one of the classes of service associated with a frame received from the first channel.

106. The apparatus of claim 105, wherein the q available buffers are reserved for the first channel based on the one class of service of a last frame received from the first channel.

107. The apparatus of claim 104, wherein a first port is associated with the first channel and a second port is associated with the second channel, and wherein the assigning means comprises:
means for sending, to the second port, the identity of the i buffers storing the frame.

108. The apparatus of claim 102, wherein a first port is associated with the first channel and a second port is associated with the second channel, further comprising:
  means for receiving, at the first port, a frame from the first channel;
  means for storing the frame in i of the q buffers;
  means for changing the status of the i buffers to unavailable;
  means for sending, to the second port, the identity of the i buffers storing the frame;
  means for retrieving, at the second port, the frame using the identity of the i buffers storing the frame;
  means for sending the frame to the second channel; and
  means for changing the status of the i buffers to available.

109. The apparatus of claim 102, wherein the exercising means comprises:
  means for sending a pause frame to the first channel.

110. The apparatus of claim 104, wherein the terminating means comprises:
  means for sending a pause release frame to the first channel.

111. An apparatus for sending a frame of data from a first channel to a second channel comprising:
  a memory having m memory buffers for storing a frame, m being at least 2, in which n of the m buffers have an available status and p of the m buffers have an unavailable status, wherein m=n+p;
  a queue controller to reserve q of the n buffers having the available status to the first channel, and to reserve r of the n buffers having the available status to the second channel, wherein $q+r \leq n$; and
  an ingress module associated with the first channel to, when a frame is received from the first channel, store the frame in i of the q buffers, wherein $1 \leq i \leq q$, and changing status of the i buffers to unavailable;
  wherein the ingress module associated with the first channel exercises flow control on the first channel when a number s of the q buffers is below a predetermined threshold, wherein $s \leq q$; and
  wherein the queue controller sends the frame to the second channel and changes the status of the i buffers to available.

112. The apparatus of claim 111, wherein s=q.

113. The apparatus of claim 111, wherein s=q−i.

114. The apparatus of claim 112, wherein the ingress module terminates flow control on the first channel when the number of s buffers is above a second predetermined threshold.

115. The apparatus of claim 112, wherein each frame has one of a plurality of classes of service associated therewith, and wherein the queue controller reserves the q available buffers for the first channel based on one of the classes of service associated with a frame received from the first channel.

116. The apparatus of claim 115, wherein the q available buffers are reserved for the first channel based on the one class of service of a last frame received from the first channel.

117. The apparatus of claim 114, wherein a first port is associated with the first channel and a second port is associated with the second channel, and wherein the queue controller sends, to the second port, the identity of the i buffers storing the frame.

118. The apparatus of claim 112, wherein:
  the ingress module receives a frame from the first channel, stores the frame in i of the q buffers, and changes the status of the i buffers to unavailable;
  the queue controller sends, to the second port, the identity of the i buffers storing the frame; and
  the egress module retrieves, at the second port, the frame using the identity of the i buffers storing the frame, sends the frame to the second channel, and changes the status of the i buffers to available.

119. The apparatus of claim 112, wherein the ingress module sends a pause frame to the first channel.

120. The apparatus of claim 114, wherein the ingress module sends a pause release frame to the first channel.

121. A method for sending a frame of data from a first device to a second device through a network switch having m memory buffers for storing a frame, m being at least 2, in which n of the m buffers have an available status and p of the m buffers have an unavailable status, wherein m=n+p, wherein the first device is connected to the network switch by a first channel and the second device is connected to the network switch by a second channel, the method comprising:
  selecting, by the first device, the second device as a destination for the frame; sending, by the first device, the frame to the first channel;
  reserving q of the n buffers having the available status to the first channel;
  reserving r of the n buffers having the available status to the second channel, wherein $q+r \leq n$;
  wherein when the frame is received from the first channel, the network switch stores the frame in i of the q buffers, wherein $1 \leq i \leq q$, and changes status of the i buffers to unavailable;
  wherein the network switch sends the frame to the second channel and changes the status of the i buffers to available;
  wherein the network switch exercises flow control on the first channel when a number s of the q buffers is below a predetermined threshold, wherein $s \leq q$; and
  receiving, by the second device, the frame from the second channel.

122. The method of claim 121, wherein s=q.

123. The method of claim 121, wherein s=q−i.

124. The method of claim 122, further comprising:
  terminating flow control on the first channel when the number of s buffers is above a second predetermined threshold.

125. The method of claim 122, wherein each frame has one of a plurality of classes of service associated therewith, and wherein the step of reserving q of the n buffers comprises:
  reserving the q available buffers for the first channel based on one of the classes of service associated with a frame received from the first channel.

126. The method of claim 125, wherein the q available buffers are reserved for the first channel based on the one class of service of a last frame received from the first channel.

127. The method of claim 124, wherein a first port is associated with the first channel and a second port is associated with the second channel, and wherein the assigning step comprises:
  sending, to the second port, the identity of the i buffers storing the frame.

128. The method of claim 122, wherein a first port is associated with the first channel and a second port is associated with the second channel, further comprising:
  receiving, at the first port, a frame from the first channel;
  storing the frame in i of the q buffers;
  changing the status of the i buffers to unavailable;

sending, to the second port, the identity of the i buffers storing the frame;

retrieving, at the second port, the frame using the identity of the i buffers storing the frame;

sending the frame to the second channel; and changing the status of the i buffers to available.

129. The method of claim 122, wherein the exercising step comprises:

sending a pause frame to the first channel.

130. The method of claim 124, wherein the terminating step comprises:

sending a pause release frame to the first channel.

131. Computer-readable media embodying instructions executable by a computer to perform a method for sending a frame of data from a first device to a second device through a network switch having m memory buffers for storing a frame, m being at least 2, in which n of the m buffers have an available status and p of the m buffers have an unavailable status, wherein m=n+p, wherein the first device is connected to the network switch by a first channel and the second device is connected to the network switch by a second channel, the method comprising:

selecting, by the first device, the second device as a destination for the frame;

sending, by the first device, the frame to the first channel;

reserving q of the n buffers having the available status to the first channel;

reserving r of the n buffers having the available status to the second channel, wherein q+r≦n;

wherein when the frame is received from the first channel, the network switch stores the frame in i of the q buffers, wherein 1≦i≦q, and changes status of the i buffers to unavailable;

wherein the network switch sends the frame to the second channel and changes the status of the i buffers to available;

wherein the network switch exercises flow control on the first channel when a number s of the q buffers is below a predetermined threshold, wherein s≦q; and receiving, by the second device, the frame from the second channel.

132. The media of claim 131, wherein s=q.

133. The media of claim 131, wherein s=q−i.

134. The media of claim 132, wherein the method further comprises:

terminating flow control on the first channel when the number of s buffers is above a second predetermined threshold.

135. The media of claim 132, wherein each frame has one of a plurality of classes of service associated therewith, and wherein the step of reserving q of the n buffers comprises:

reserving the q available buffers for the first channel based on one of the classes of service associated with a frame received from the first channel.

136. The media of claim 135, wherein the q available buffers are reserved for the first channel based on the one class of service of a last frame received from the first channel.

137. The media of claim 134, wherein a first port is associated with the first channel and a second port is associated with the second channel, and wherein the assigning step comprises:

sending, to the second port, the identity of the i buffers storing the frame.

138. The media of claim 132, wherein a first port is associated with the first channel and a second port is associated with the second channel, wherein the method further comprises:

receiving, at the first port, a frame from the first channel;

storing the frame in i of the q buffers;

changing the status of the i buffers to unavailable;

sending, to the second port, the identity of the i buffers storing the frame;

retrieving, at the second port, the frame using the identity of the i buffers storing the frame;

sending the frame to the second channel; and changing the status of the i buffers to available.

139. The media of claim 132, wherein the exercising step comprises:

sending a pause frame to the first channel.

140. The media of claim 134, wherein the terminating step comprises:

sending a pause release frame to the first channel.

141. An apparatus for sending a frame of data from a first device to a second device through a network switch having m memory buffers for storing a frame, m being at least 2, in which n of the m buffers have an available status and p of the m buffers have an unavailable status, wherein m=n+p, wherein the first device is connected to the network switch by a first channel and the second device is connected to the network switch by a second channel, the apparatus comprising:

select means for selecting, by the first device, the second device as a destination for the frame;

send means for sending, by the first device, the frame to the first channel;

first reservation means for reserving q of the n buffers having the available status to the first channel;

second reservation means for reserving r of the n buffers having the available status to the second channel, wherein q+r≦n;

wherein when the frame is received from the first channel, the network switch stores the frame in i of the q buffers, wherein 1≦i≦q, and changes status of the i buffers to unavailable;

wherein the network switch sends the frame to the second channel and changes the status of the i buffers to available;

wherein the network switch exercises flow control on the first channel when a number s of the q buffers is below a predetermined threshold, wherein s≦q; and receive means for receiving, by the second device, the frame from the second channel.

142. The apparatus of claim 141, wherein s=q.

143. The apparatus of claim 141, wherein s=q−i.

144. The apparatus of claim 142, further comprising:

means for terminating flow control on the first channel when the number of s buffers is above a second predetermined threshold.

145. The apparatus of claim 142, wherein each frame has one of a plurality of classes of service associated therewith, and wherein the first reservation means comprises:

means for reserving the q available buffers for the first channel based on one of the classes of service associated with a frame received from the first channel.

146. The apparatus of claim 145, wherein the q available buffers are reserved for the first channel based on the one class of service of a last frame received from the first channel.

147. The apparatus of claim 144, wherein a first port is associated with the first channel and a second port is associated with the second channel, and wherein the assigning means comprises:

means for sending, to the second port, the identity of the i buffers storing the frame.

148. The apparatus of claim 142, wherein a first port is associated with the first channel and a second port is associated with the second channel, further comprising:

means for receiving, at the first port, a frame from the first channel;

means for storing the frame in i of the q buffers;

means for changing the status of the i buffers to unavailable;

means for sending, to the second port, the identity of the i buffers storing the frame;

means for retrieving, at the second port, the frame using the identity of the i buffers storing the frame;

means for sending the frame to the second channel; and changing the status of the i buffers to available.

149. The apparatus of claim 142, wherein the exercising step comprises:

sending a pause frame to the first channel.

150. The apparatus of claim 144, wherein the terminating step comprises:

sending a pause release frame to the first channel.

151. A network comprising:

a network switch having m memory buffers for storing a frame of data, m being at least 2, in which n of the m buffers have an available status and p of the m buffers have an unavailable status, wherein m=n+p;

a first device connected to the network switch by a first channel; and a second device connected to the network switch by a second channel;

wherein the network switch reserves q of the n buffers having the available status to the first channel, and reserves r of the n buffers having the available status to the second channel, wherein $q+r \leq n$;

wherein when a frame is received from the first channel, the network switch stores the frame in i of the q buffers, wherein $1 \leq i \leq q$, and changes status of the i buffers to unavailable;

wherein the network switch sends the frame to the second channel and changes the status of the i buffers to available;

wherein the network switch exercises flow control on the first channel when a number s of the q buffers is below a predetermined threshold, wherein $s \leq q$; and wherein the second device receives the frame from the second channel.

152. The network of claim 151, wherein s=q.

153. The network of claim 151, wherein s=q−i.

154. The network of claim 152, wherein the network switch terminates flow control on the first channel when the number of s buffers is above a second predetermined threshold.

155. The network of claim 152, wherein each frame has one of a plurality of classes of service associated therewith, and wherein the network switch reserves the q available buffers for the first channel based on one of the classes of service associated with a frame received from the first channel.

156. The network of claim 155, wherein the q available buffers are reserved for the first channel based on the one class of service of a last frame received from the first channel.

157. The network of claim 154, wherein the network switch comprises:

a first port associated with the first channel;

a second port associated with the second channel; and a queue controller to send, to the second port, the identity of the i buffers storing the frame.

158. The network of claim 152, wherein the network switch comprises:

an ingress module to receive a frame from the first channel;

a queue controller to store the frame in i of the q buffers, change the status of the i buffers to unavailable, and send, to the second port, the identity of the i buffers storing the frame; and an egress module to retrieve, at the second port, the frame using the identity of the i buffers storing the frame, send the frame to the second channel, and change the status of the i buffers to available.

159. The network of claim 152, wherein the network switch sends a pause frame to the first channel.

160. The network of claim 154, wherein the network switch sends a pause release frame to the first channel.

\* \* \* \* \*

UNITED STATES PATENT AND TRADEMARK OFFICE
CERTIFICATE OF CORRECTION

PATENT NO.       : 7,035,273 B1
APPLICATION NO.  : 10/071417
DATED            : April 25, 2006
INVENTOR(S)      : Donald Pannell et al.

It is certified that error appears in the above-identified patent and that said Letters Patent is hereby corrected as shown below:

Column 6, Line 58:      Delete "are"
Column 23, Line 43:     Delete second "a" after "by"
Column 23, Line 53:     Delete "r" at end of equation and insert --n--

Signed and Sealed this

Nineteenth Day of December, 2006

JON W. DUDAS
*Director of the United States Patent and Trademark Office*